(12) United States Patent
Oltman et al.

(10) Patent No.: US 9,980,021 B2
(45) Date of Patent: May 22, 2018

(54) SCALABLE SWITCH FABRIC USING OPTICAL INTERCONNECTS

(71) Applicant: Ciena Corporation, Hanover, MD (US)

(72) Inventors: John K. Oltman, Chamblee, GA (US); Jeffery T. Nichols, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/287,876

(22) Filed: Oct. 7, 2016

(65) Prior Publication Data

US 2017/0105060 A1 Apr. 13, 2017

Related U.S. Application Data

(60) Provisional application No. 62/238,471, filed on Oct. 7, 2015.

(51) Int. Cl.
 *H04Q 11/00* (2006.01)
(52) U.S. Cl.
 CPC . *H04Q 11/0005* (2013.01); *H04Q 2011/0032* (2013.01); *H04Q 2011/0056* (2013.01)
(58) Field of Classification Search
 None
 See application file for complete search history.

(56) References Cited

U.S. PATENT DOCUMENTS

| 7,184,432 | B2 | 2/2007 | Adam et al. |
| 7,245,582 | B1 | 7/2007 | Roberts et al. |
| 7,592,894 | B2 | 9/2009 | Torza |
| 8,155,520 | B1 | 4/2012 | West et al. |
| 8,649,370 | B2 | 2/2014 | Larsson et al. |
| 8,885,991 | B2 | 11/2014 | Ty Tan et al. |
| 9,124,383 | B1 | 9/2015 | Frankel et al. |
| 9,282,384 | B1 * | 3/2016 | Graves ............... H04Q 11/0005 |
| 9,354,412 | B2 | 5/2016 | Binkert et al. |
| 2003/0118013 | A1 | 6/2003 | Steele et al. |
| 2007/0092248 | A1 * | 4/2007 | Jennen .................. H04J 14/021 398/45 |
| 2009/0154342 | A1 | 6/2009 | Oltman et al. |
| 2010/0254705 | A1 * | 10/2010 | Perkins .............. H04Q 11/0005 398/48 |

(Continued)

OTHER PUBLICATIONS

Nathan Farrington et al., Helios: A Hybrid Electrical/Optical Switch Architecture for Modular Data Centers, University of California, San Diego, pp. 1-12.

(Continued)

*Primary Examiner* — Darren E Wolf
(74) *Attorney, Agent, or Firm* — Clements Bernard Walker PLLC; Christopher L. Bernard; Lawrence A. Baratta, Jr.

(57) ABSTRACT

A scalable switch fabric using optical interconnects includes one or more line modules each including fabric interface optics supporting a plurality of optical output signals; an optical interconnect optically connected to each of the one or more line modules via the fabric interface optics; and one or more center stage switches, wherein the optical interconnect is adapted to shuffle the plurality of optical output signals from each of the one or more line modules to the one or more center stage switches. The optical interconnect can include two levels of shuffle to distribute each of the plurality of optical signals from each of the fabric interface optics to the one or more center stage switches.

14 Claims, 41 Drawing Sheets

(56) References Cited

U.S. PATENT DOCUMENTS

2011/0292932 A1 12/2011 Nichols et al.
2013/0114953 A1 5/2013 Moynihan et al.
2013/0287397 A1 10/2013 Frankel et al.
2014/0095743 A1 4/2014 Nichols et al.
2015/0125112 A1 5/2015 Frankel et al.

OTHER PUBLICATIONS

Wenjia Zhang et al., Broadband Silicon Photonic Packet-Switching Node for Large-Scale Computing Systems, IEEE Photonics Technology Letters, vol. 24, No. 8, Apr. 15, 2012, pp. 688-690.

Runxiang Yu et al., A scalable silicon photonic chip-scale optical switch for high performance computing systems, 2013 Optical Society of America, pp. 1-13.

Aleksandr Biberman et al., Broadband Silicon Photonic Electrooptic Switch for Photonic Interconnection Networks, IEEE Photonics Technology Letters, vol. 23, No. 8, Apr. 15, 2011, pp. 504-506.

Johnnie Chan et al., Architectural Exploration of Chip-Scale Photonic Interconnection Network Designs Using Physical-Layer Analysis, Journal of Lightwave Technology, vol. 28, No. 9, May 1, 2010, pp. 1305-1315.

\* cited by examiner

US 9,980,021 B2

SCALABLE SWITCH FABRIC USING OPTICAL INTERCONNECTS

CROSS-REFERENCE TO RELATED APPLICATION(S)

The present patent/patent application claims priority to U.S. Provisional Application No. 62/238,471, filed Oct. 7, 2015, and entitled "SCALABLE SWITCH FABRIC USING OPTICAL INTERCONNECTS," the contents of which are incorporated by reference.

FIELD OF THE DISCLOSURE

The present disclosure generally relates to networking systems and methods. More particularly, the present disclosure relates to a scalable switch fabric using optical interconnects.

BACKGROUND OF THE DISCLOSURE

Switches are growing in capacity especially considering growth in data centers and the like. Conventionally, switches rely on electrical interconnects across a backplane to provide interconnection between switch fabric stages (e.g., between line modules and switch modules, between stages, etc.). Disadvantageously, such electrical interconnects are limited in terms of scaling (adding modules) within the constraint of the backplane/chassis in which they reside. As the desire to increase switch fabric capacity grows beyond what a single chassis can provide, there becomes a need to introduce additional fabric elements and/or fabric stages. For example, in a 3-stage Clos fabric, the center or $2^{nd}$ stage can introduce additional fabric elements to increase fabric size, but such growth requires flexibility to re-distribute the interconnection between the $1^{st}/3^{rd}$ and $2^{nd}$ stages. An electrical backplane provides more of a fixed configuration making such fabric expansion difficult by this means. An alternative is to grow the fabric scale by introducing more fabric stages, such as with a five stage Clos fabric implementation. In this case, the fabric elements which include the $2^{nd}$ and $4^{th}$ stage may have half of their Input/Output (I/O) capabilities split between interconnection to the $1^{st}$ and $5^{th}$ stage and the center or $3^{rd}$ stage. While allowing for fabric growth, this can require a sizable increase in fabric elements in order to deliver the same amount of non-blocking fabric capacity. For example, the equivalent capacity of one switch element may require three equivalent switch elements to deliver the same capacity.

In any case, when trying to scale the fabric capacity the sheer number of signals which must be managed and physically re-distributed to support a scalable fabric becomes a constraint. The sheer number of signals in a large scale fabric design become an issue when scaling beyond what can be accomplished in a single chassis. As an example, consider a target non-blocking fabric capacity of 500 Tbps where the state of the art electrical Serializer/Deserialize (SERDES) rates are on the order of 50 Gbps, can require a minimum of 10,000 such signals. With the objective of scaling fabric capacity from multi-Tbps to Pbps (Peta-Bit) capacities, there is a need for the ability to grow the fabric scale over time, maintain the efficiencies of a three-stage Clos configuration as long as possible, manage the changing distribution of signals across the fabric as it grows in capacity, leverage such distribution using optical signals which can advantageously be combined on very dense cabling solutions and also provide a means to carry high bandwidth signals over the required physical distances.

BRIEF SUMMARY OF THE DISCLOSURE

In an exemplary embodiment, a scalable switch fabric using optical interconnects includes one or more line modules each including fabric interface optics supporting a plurality of optical output signals; an optical interconnect optically connected to each of the one or more line modules via the fabric interface optics; and one or more center stage switches, wherein the optical interconnect is adapted to shuffle the plurality of optical output signals from each of the one or more line modules to the one or more center stage switches. The optical interconnect can include two levels of shuffle to distribute each of the plurality of optical signals from each of the fabric interface optics to the one or more center stage switches. The optical interconnect can include a first level of shuffle connected to the one or more line modules and a second level of shuffle integrated with the one or more center stage switches as a fabric block. Optical connections in the fabric block remain fixed as the scalable switch fabric grows and optical connections between the first level and the second level are modified as the scalable switch fabric grows. The scalable switch fabric can include N fabric blocks, N being an integer, with each additional fabric block adding additional capacity. Optical connections between the optical interconnect and the one or more center stage switches remain fixed as the scalable switch fabric grows. The optical interconnect can connect to the one or more line modules via bundled fiber cables each including a plurality of optical fibers and a single connector for all of the plurality of optical fibers. The optical interconnect can connect to the one or more line modules via Dense Wave Division Multiplexing (DWDM) for the plurality of optical output signals from each of the fabric interface optics. The optical interconnect can utilize a cyclic Arrayed Waveguide Grating (AWG) to perform the optical shuffle. The scalable switch fabric can be connected with an existing switch including an electrical backplane for expansion thereof.

In another exemplary embodiment, a scalable switch fabric method using optical interconnects includes providing one or more line modules each including fabric interface optics supporting a plurality of optical output signals; providing an optical interconnect optically connected to each of the one or more line modules via the fabric interface optics; and providing one or more center stage switches, wherein the optical interconnect is adapted to shuffle the plurality of optical output signals from each of the one or more line modules to the one or more center stage switches. The optical interconnect can include two levels of shuffle to distribute each of the plurality of optical signals from each of the fabric interface optics to the one or more center stage switches. The optical interconnect can include a first level of shuffle connected to the one or more line modules and a second level of shuffle integrated with the one or more center stage switches as a fabric block. Optical connections in the fabric block remain fixed as the scalable switch fabric grows and connectivity between the first level and the second level is modified as the scalable switch fabric grows. The optical interconnect can connect to the one or more line modules via bundled fiber cables each including a plurality of optical fibers and a single connector for all of the plurality of optical fibers. The optical interconnect can connect to the one or more line modules via Dense Wave Division Multiplexing (DWDM) for the plurality of optical output signals from each of the fabric interface optics. The scalable switch fabric can be connected with an existing switch including an electrical backplane for expansion thereof.

In a further exemplary embodiment, a switch system with optical interconnections includes one or more line modules each including fabric interface optics supporting a plurality of optical output signals; a first level of optical shuffle connected to each of the fabric interface optics; and one or more fabric blocks each including a second level of optical shuffle connected to the first level of optical shuffle and a plurality of center stage switches each optically connected to the second level of optical shuffle in a fixed manner; wherein expansion of the switch system includes modification of connections between the first level of optical shuffle and the second level of optical shuffle. The one or more line modules can be connected to the first level of optical shuffle via bundled fiber cables each including a plurality of optical fibers and a single connector for all of the plurality of optical fibers. The one or more line modules can be connected to the first level of optical shuffle via Dense Wave Division Multiplexing (DWDM) for the plurality of optical output signals from each of the fabric interface optics.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a scalable switch fabric using optical interconnects is described. The scalable fabric uses two layers of "shuffle"/signal distribution to minimize fiber cabling while allowing for in-service reconfiguration of fabric density. As described herein, a multi-stage switch fabric requires a "shuffle" of the outputs of the previous stage to in the inputs of the current stage. The systems and methods described herein accomplish this shuffle via optical interconnects enabling a scalable architecture. The fiber cabling between elements can be, for example, based on parallel ribbon fiber or a single fiber carrying a multiplex of Dense Wave Division Multiplexed (DWDM) wavelengths. In an exemplary embodiment, the scalable fabric can be used in a spine switch or the like providing hundreds to thousands of Tb/s bandwidth. In an exemplary embodiment, the scalable fabric can be used to build a non-blocking switch fabric in a Packet Switch, an Optical Transport Network (OTN) switch, an electrical wavelength level switch (Reconfigurable Electrical Add/

Drop Multiplexer, or the like. Advantageously, the scalable fabric utilizes a simplified optical fiber and connector structure which significantly reduces the number of cables and connectors as well as implements a topology which can efficiently be upgraded without traffic hits in-service.

Switch Architecture

Figure 1:
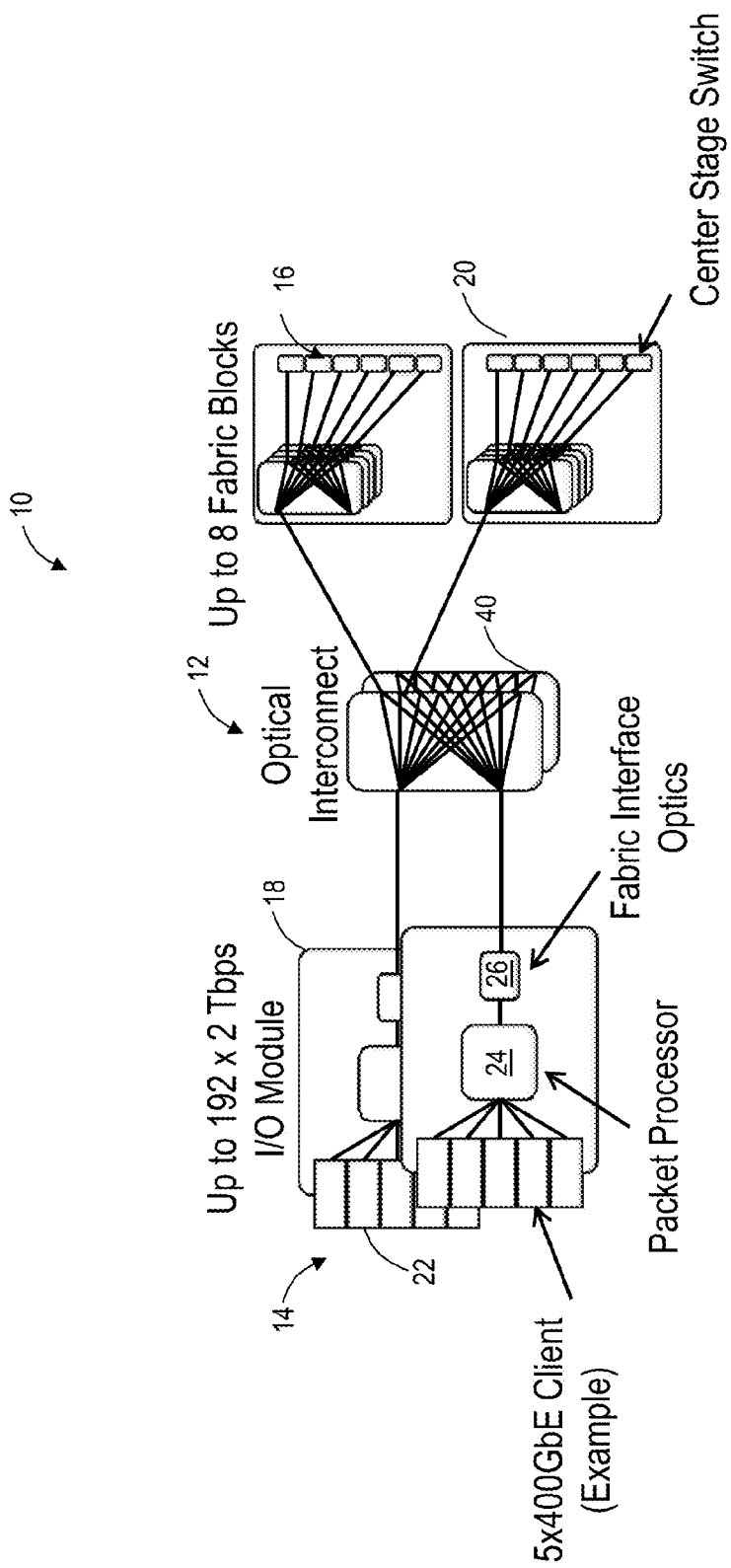
FIG. 1 is a block diagram of a switch utilizing an optical interconnect.

Referring to FIG. 1, in an exemplary embodiment, a block diagram illustrates a switch 10 utilizing an optical interconnect 12. In an exemplary embodiment and for illustration purposes, the switch 10 is a packet switch utilizing three stages, e.g., a three-stage Clos switch fabric or a folded Clos switch fabric. The switch 10 includes an ingress/egress switch element 14 representing a combined packet processor function and stage one and three of the fabric and a center stage switch element 16 representing stage two of the fabric. The ingress/egress switch element 14 can be realized by line modules (LM) 18 and the center stage switch element 16 can be realized by switch modules (SM) 20. The line modules 18 can include interface optics 22, such a 5×400 GbE client interfaces, which interface with a packet processor 24 (and/or fabric adapting circuitry) which interfaces to fabric interface optics 26. Note, while this example contemplates packet processing in the switch 10, those of ordinary skill in the art will recognize the optical interconnect 12 can be used in any switch type, i.e., Time Division Multiplexing (TDM) such as OTN, wavelength level switch at the electrical level (READM), and the like.

In various exemplary embodiments, the switch 10 uses a scalable fabric which has the line modules 18 optically interconnect with the switch modules 20, in lieu of electrical interconnects via a backplane, mid-plane, etc. The optical interconnect 12 advantageously allows high-speed interconnection between the modules 18, 20, supports higher bandwidth over distance relative to electrical interconnects, better supports in-service upgrades requiring the re-distribution of signals than electrical interconnects, and the like. However, conventional approaches to optical interconnections require significant amounts of fiber cabling (thousands or more cables). It is an objective of the optical interconnect 12 to reduce the fiber cabling requirements between the modules 18, 20 significantly while preserving the aforementioned advantages of an optical interconnection solution.

Again, in an exemplary embodiment and for illustration purposes, the switch 10 can be a non-blocking switch providing 100+ Tb/s of capacity in a solution that scales with the deployed capacity with a minimum number of fabric layers. Here, the switch 10 is considered a disaggregated switch where the line module 18 and switch module 20 are not required to reside in a common chassis and interface through an electrical backplane. The optical interconnect 12 provides a high density interconnect on a scale larger than can be realized by an electrical backplane.

Single Stage Fabric Limit

Figure 2:
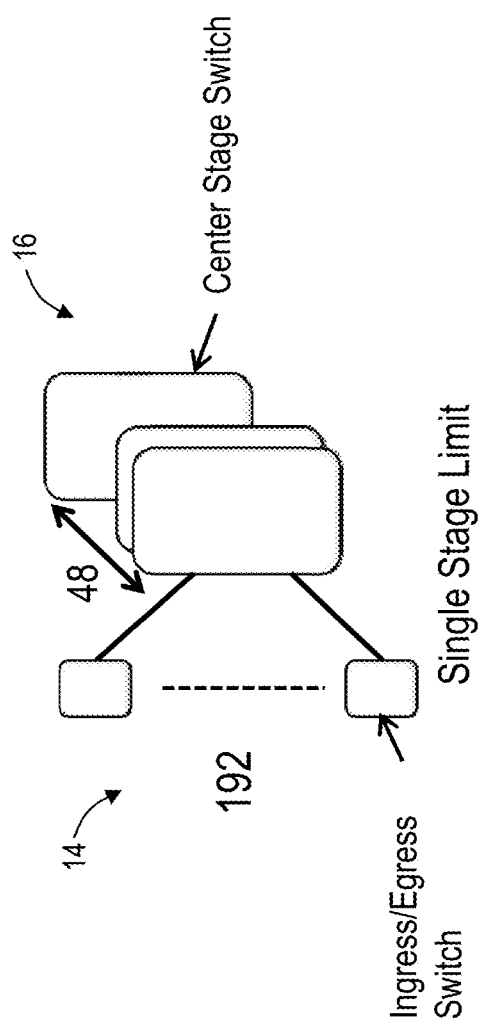
FIG. 2 is a block diagram of a single-stage fabric for describing fabric scaling limitations.

Referring to FIG. 2, in an exemplary embodiment, a block diagram illustrates a single-stage fabric for describing fabric scaling limitations. The limit in fabric scale for a single stage fabric is based on the number of SERDES supported by both the ingress/egress switch element 14 and center stage switch element 16 devices. A Serializer/Deserializer (SERDES) is a pair of functional blocks commonly used in high-speed communications to compensate for limited input/output. These blocks convert data between serial data and parallel interfaces in each direction. In an exemplary embodiment and for illustration purposes, the switch 10 has the ingress/egress switch element 14 with 48 SERDES and the center-stage switch element 16 has 192 SERDES.

Given the ingress/egress switch element 14 provides 48 SERDES, the maximum number of center stage switch element 16 devices that can be deployed in a single layer is 48 where 1 SERDES from a given ingress/egress switch element 14 is connected to each of 48 center stage switch element 16 devices. The total bandwidth limit of a single-stage fabric based on the center stage switch element 16 would support 192 ingress/egress switch element 14 devices. Given a minimum of 40 of 48 SERDES for redundancy, the maximum redundant fabric density is calculated as:

192 ingress/egress switch element 14 devices×40 SERDES×50 G/SERDES=384 Tb/s

Multi-Stage Fabric Considerations

Figure 3:
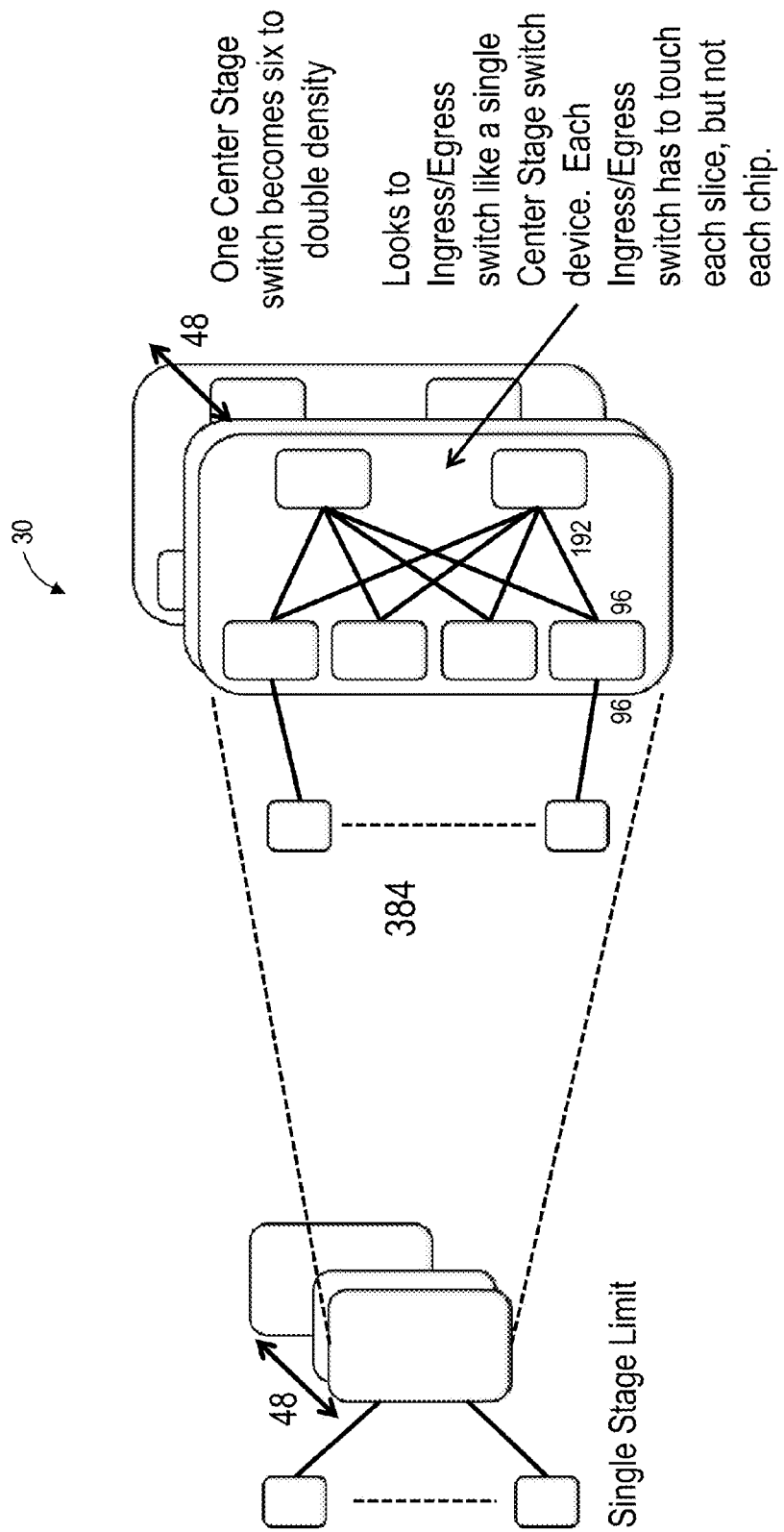
FIG. 3 is a block diagram of a multi-stage fabric.

Referring to FIG. 3, in an exemplary embodiment, a block diagram illustrates a multi-stage fabric 30. Going to the multi-stage fabric 30 has the advantage of being able to continue to grow the fabric larger, but at the cost that the center stage switch element 16 must have half of its interfaces facing the line modules 18 and the other half facing the next fabric layer. As such, it takes three chips to get back to the capacity otherwise offered by a single chip along with the necessary increase in interconnect. The objective of going beyond a three stage to a five stage fabric is to virtually make the center stage switch element 16 devices appear to have more than 192 SERDES by adding more center stage switch element 16 devices to the design.

Optical Interconnect

For switch sizes which can be accommodated by an electrical backplane, electrical interconnects are more cost effective. In many cases, such smaller switches can be combined together in a leaf/spine architecture by utilizing the standard Ethernet interfaces of the switch to realize a multi-stage fabric. However, once the required capacity of the switch 10 increases to where multiple layers of such switches are necessary to realize the fabric, the cost of optically interconnecting between such switches is incurred. The optical interconnect 12 represents a true fabric interface whereby traffic from a given flow is dispersed across all such fabric links. Some of the benefits of the fabric interface provided by the optical interconnect 12, include (i) where standard Ethernet interfaces are utilized for interconnecting layers of the fabric 30, they come at the cost of being fully packet aware with all the logic necessary to perform application level packet forwarding and modification; (ii) the granularity of such interfaces is dependent on the port size that one packet forwarding engine can handle and Equal-cost multi-path routing (ECMP)/Link Aggregation Group (LAG) must be used to fan out across the layers; (iii) the center stage switch element 16 devices are optimized for low latency forwarding of variably sized cells across a fully distributed set of links; (iv) the switch 10 supports a true 2 Tb/s+ interface from the line modules 18 into the fabric with full any-to-any connectivity and multi-cast capabilities across up to a 1.5 Pb/s fabric.

In order to distribute the fabric interface signals from the line module 18 across all of the center stage switch element 16 devices, two stages of optical "shuffle" are performed in the optical interconnect 12. In an exemplary embodiment, a first stage is performed in an optical interconnect module 40, and a second stage is performed in the switch modules 20. The optical interconnect module 40 can be a passive device which is used to both distribute the signals from a given line module 18 to up to eight different switch modules 20 and to combine the signals from six line modules 18 to a given switch element 16. Note, these values (eight different switch modules 20, six line modules 18 to a given switch element 16) are presented for illustration purposes. The optical interconnect 12 can use parallel fiber to redistribute signals as well as a wavelength level routing. The second stage "shuffle" is performed within the switch module 20 to distribute the signals across the center stage switch element 16 devices within a given switch module 20.

Figure 4:
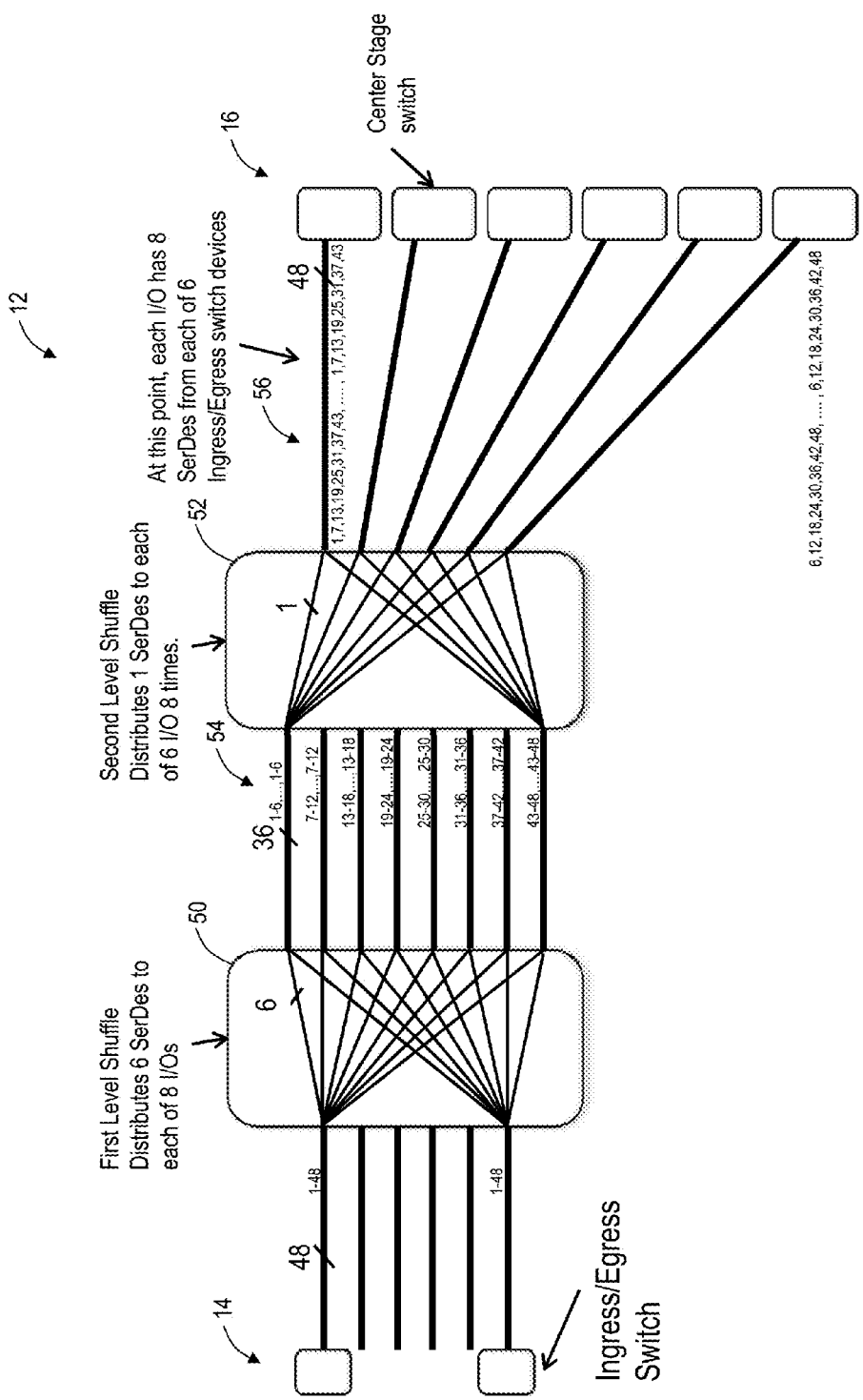
FIG. 4 is a block diagram of the optical interconnect with two levels of shuffle in a first configuration supporting six ingress/egress switch devices.

Referring to FIG. 4, in an exemplary embodiment, a block diagram illustrates the optical interconnect 12 with two levels 50, 52 of shuffle in a first configuration supporting six ingress/egress switch element 14 devices. Again, for illustration purposes, the following descriptions assume 192 SERDES on each center stage switch element 16 and 48 SERDES on each ingress/egress switch element 14. From the ingress/egress switch elements 14 towards the center stage switch elements 16, the first level 50 distributes six SERDES between each of eight optical interconnects 54 (optical interconnects between the levels 50, 52, i.e., I/O). The second level 52 distributes one SERDES between each of six optical interconnects 56 eight times. At this point, each of the six optical interconnects 56 has eight SERDES from each of the six ingress/egress switch element 14 devices. In an exemplary embodiment, each ingress/egress switch element 14 device supports 2 Tb/s and each center stage switch module 20 supports 57.6 Tb/s of total capacity and 48 Tb/s of 1:5 redundant capacity.

Figure 5:
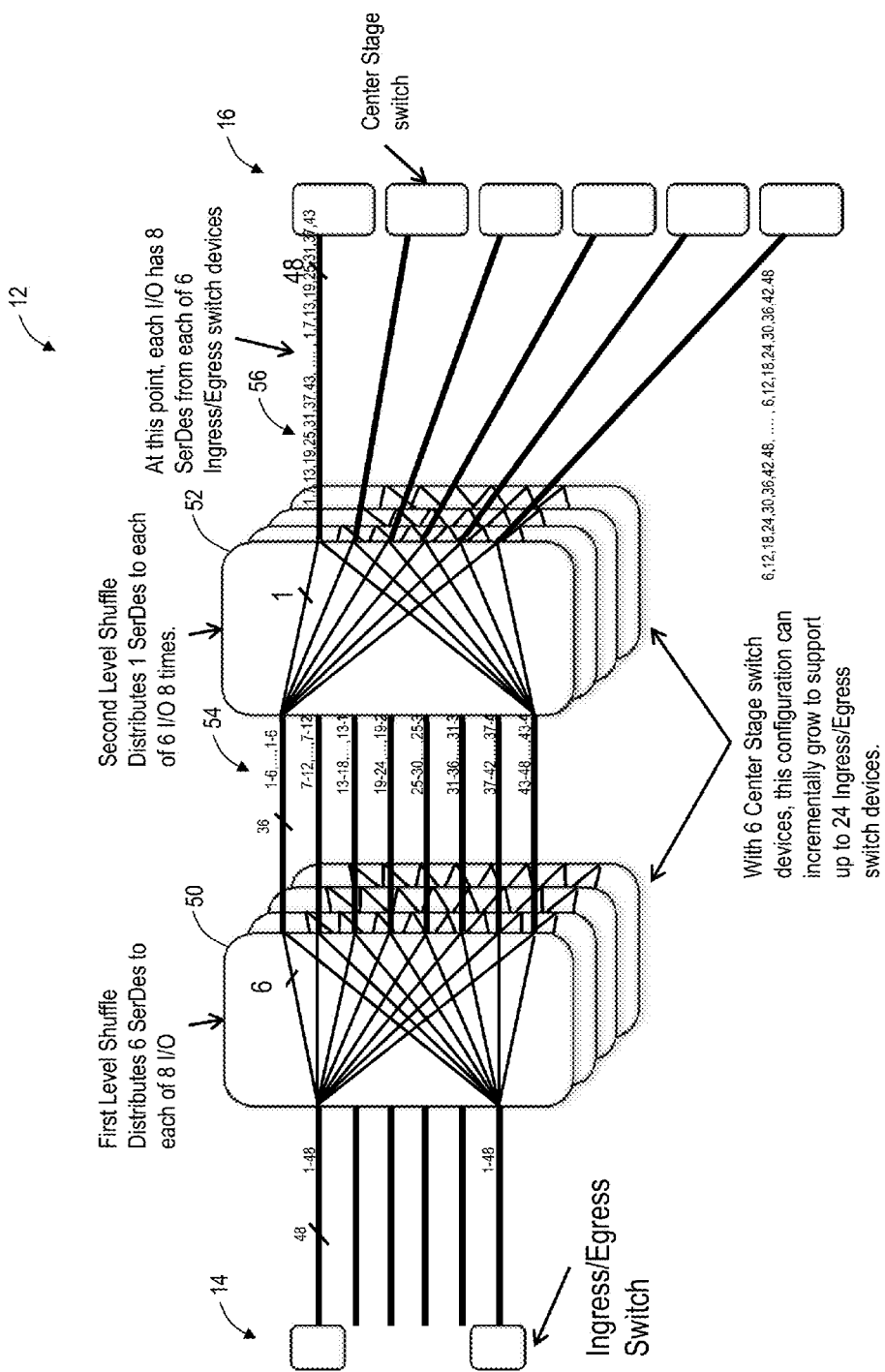
FIG. 5 is a block diagram of the optical interconnect with two levels of shuffle in a second configuration with additional components in the levels to support up to twenty-four ingress/egress switch devices.

Referring to FIG. 5, in an exemplary embodiment, a block diagram illustrates the optical interconnect 12 with two levels 50, 52 of shuffle in a second configuration with additional components in the levels 50, 52 to support up to twenty-four ingress/egress switch element 14 devices. Note, the six center stage switch element 16 devices from FIG. 4 can support up to the twenty-four ingress/egress switch element 14 devices. Thus, from the switch 10 can grow from the first configuration in FIG. 4 with six ingress/egress switch element 14 devices to the second configuration in FIG. 5 with twenty-four ingress/egress switch element 14 devices. The transition from the first configuration to the second configuration is in-service and without requiring adjustment of cables between the ingress/egress switch element 14 devices and the first level 50 and on the optical interconnects 56. Incremental cabling is performed in the optical interconnects 54 between the levels 50, 52. The levels 50, 52 now include additional components to support the twenty-four ingress/egress switch element 14 devices. Also, for illustration purposes, connectivity is only shown on a first level between the first six ingress/egress switch element 14 devices. That is, those of ordinary skill in the art will recognize FIG. 5 could include additional ingress/egress switch element 14 devices and additional connections in the optical interconnects 54, 56.

Figure 6:
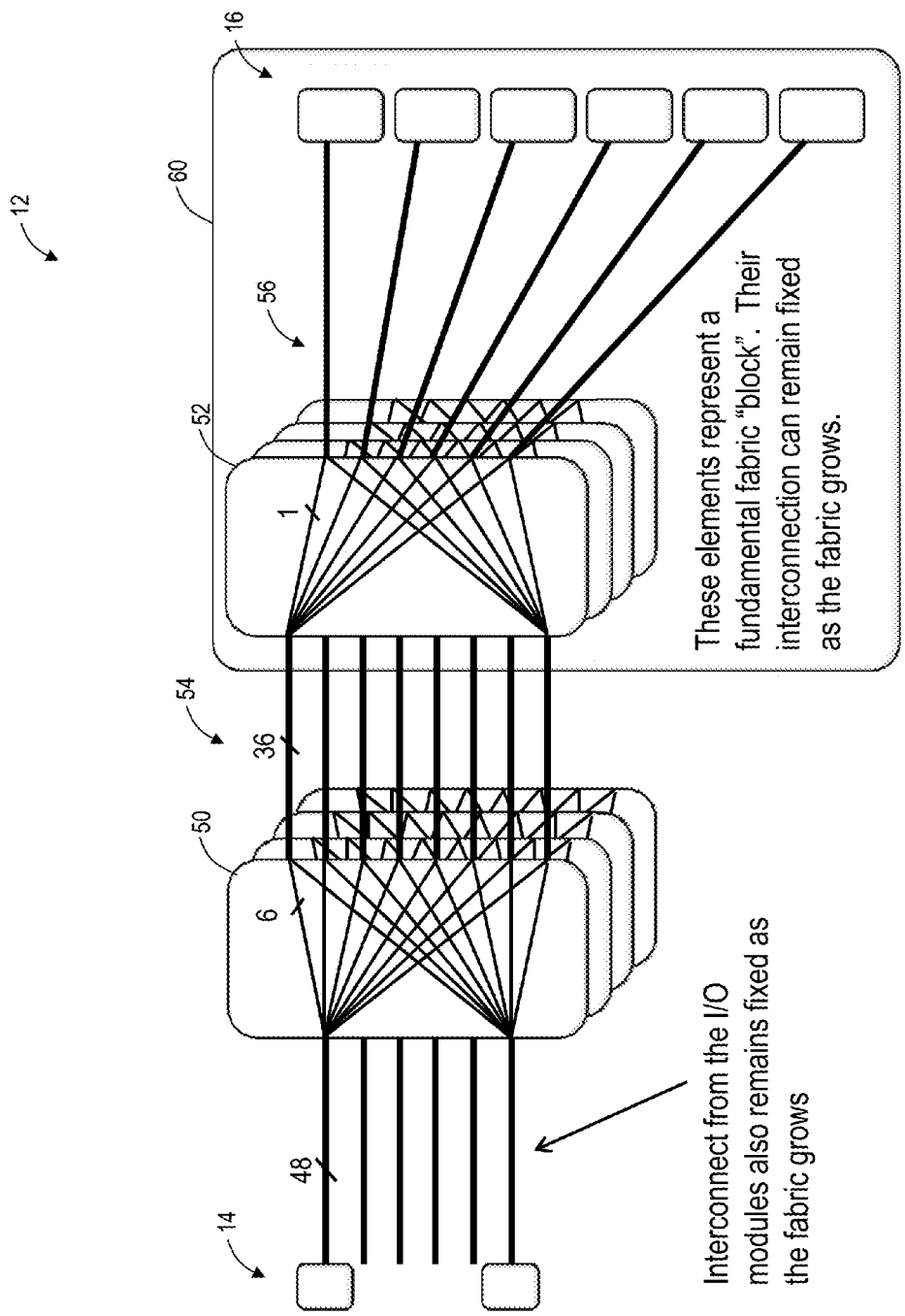
FIG. 6 is a block diagram of the optical interconnect in the second configuration as a fundamental fabric block for building a larger fabric.

Referring to FIG. 6, in an exemplary embodiment, a block diagram illustrates the optical interconnect 12 in the second configuration as a fundamental fabric block 60 for building a larger fabric. Note, the fundamental fabric block 60 can be the center stage switch module 20. The fundamental fabric block 60 has a fixed interconnection for the six optical interconnects 56 while the fabric grows. Additionally, an interconnection from the ingress/egress switch element 14 devices to the first level 50 also remains fixed as the fabric grows. All growth is accomplished by recabling between the levels 50, 52 in the optical interconnects 54 as described herein. In an exemplary embodiment, the switch 10 in the configuration of FIGS. 5 and 6 support 57.6 Tb/s of total capacity and 48 Tb/s of 1:5 redundant capacity based on 50 Gbps SERDES.

In an exemplary embodiment, the fundamental fabric block can operate with N+1 redundancy (N working center stage switches 16 or FEs and 1 idle/protect). For example, in the case where the fabric block has 6 Fabric Elements, only 5 Fabric Elements are required for full capacity of the switch. If there are no FE failures, the fabric block 60 does not lose capacity while being upgraded. However, the order that fibers are transitioned must be carefully planned to maintain the Clos symmetry.

Figure 7A:
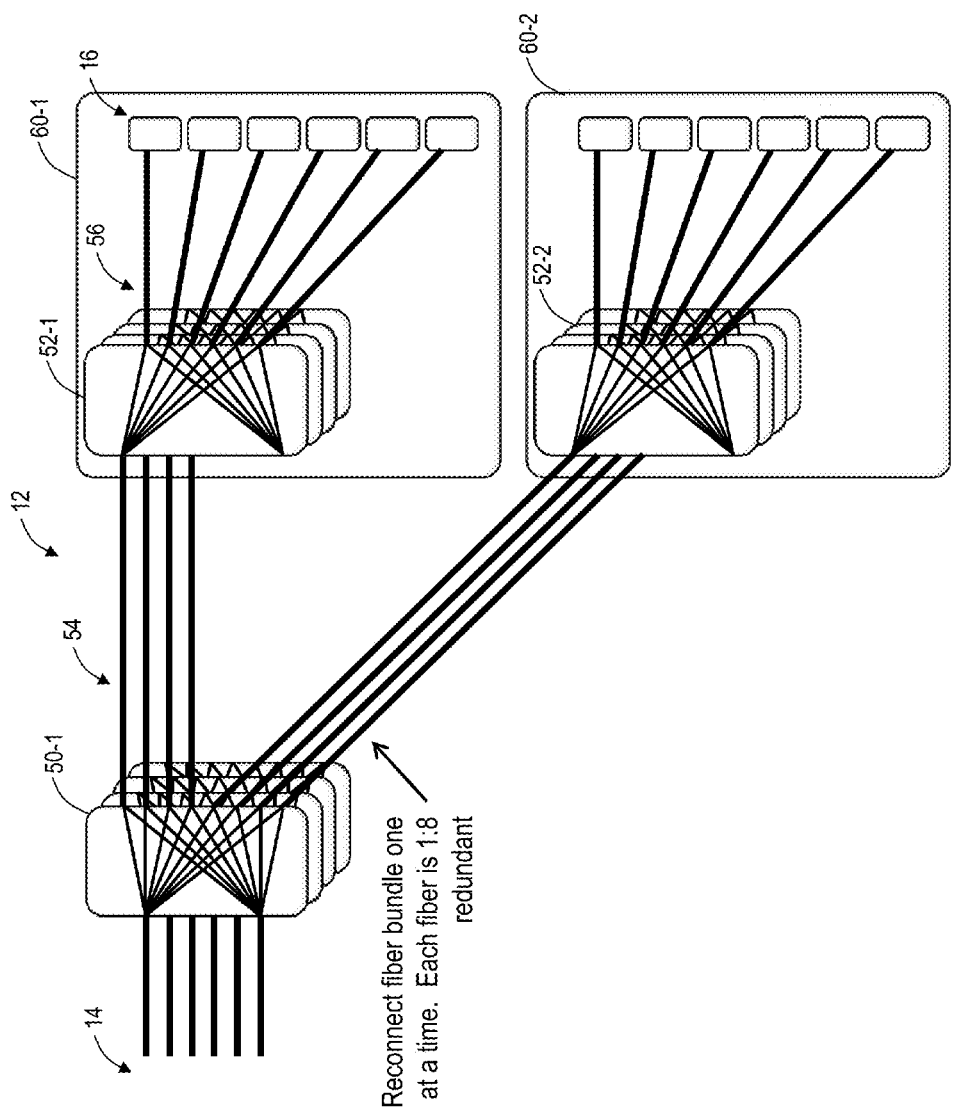
FIGS. 7A-7B are block diagrams of the optical interconnect in a third configuration with a second fundamental fabric block to support up to forty-eight ingress/egress switch devices.
Figure 7B:
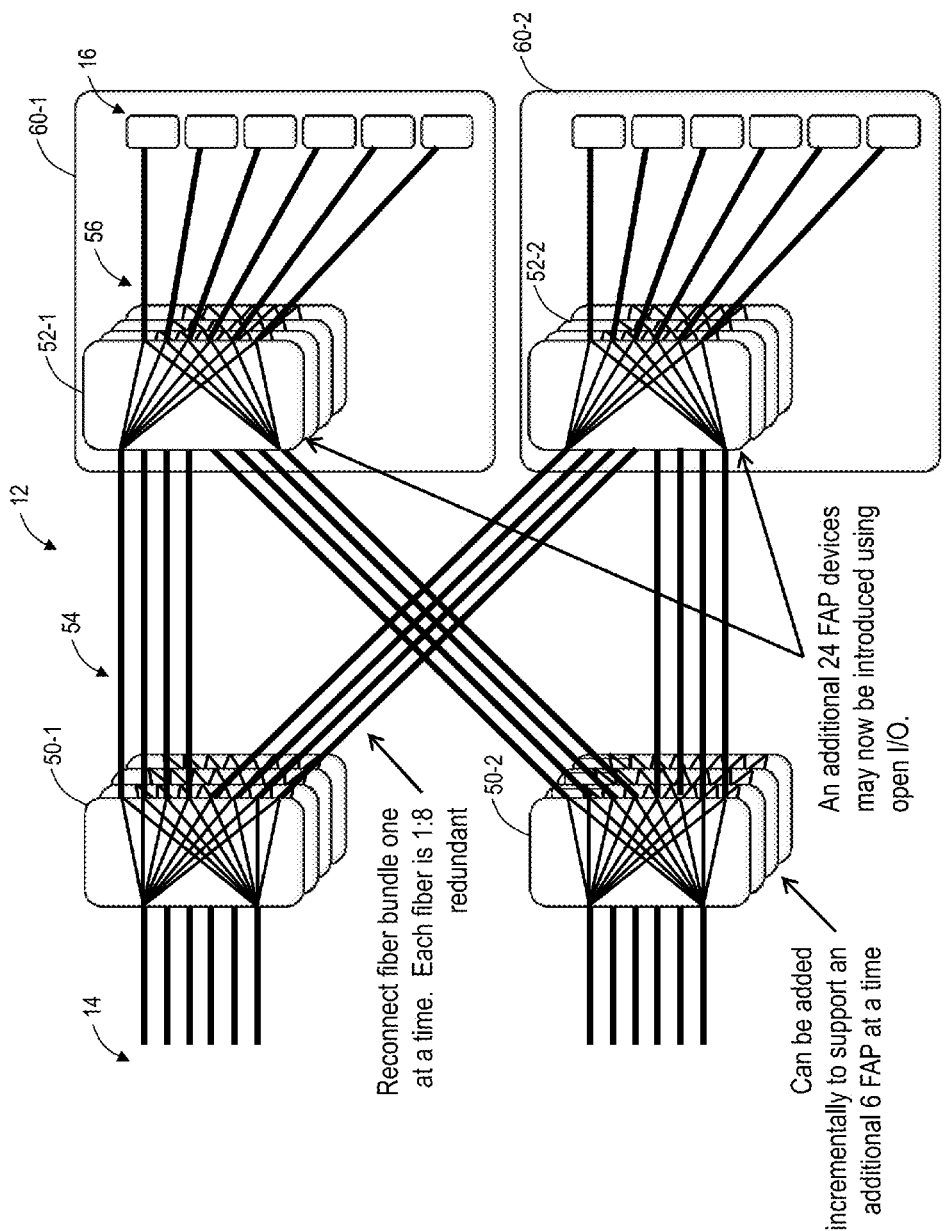

Referring to FIGS. 7A-7B, in an exemplary embodiment, block diagrams illustrate the optical interconnect 12 in a third configuration with a second fundamental fabric block 60-2 to support up to forty-eight ingress/egress switch element 14 devices. Specifically, FIGS. 7A-7B illustrate an in-service upgrade from the second configuration. Again, the upgrade from the second configuration to the third configuration is performed, from a cabling perspective, in the optical interconnects 54 between the levels 50, 52. For illustration purposes, the levels 50, 52 from the first and second configuration are now referred to as levels 50-1, 52-1 and the first fundamental fabric block 60 is now referred to as first fundamental fabric block 60-1.

In FIG. 7A, the second fundamental fabric block 60-2 is added, and half of the fiber connections from the first level 50-1 are reconnected to a second level 52-2 in the second fundamental fabric block 60-2. Now, in FIG. 7B, up to forty-eight additional ingress/egress switch element 14 devices can be added by cabling the optical interconnects 54 to the second levels 52-1, 52-2. Note, again, one advantage of the optical interconnect 12 is the addition of new ingress/egress switch element 14 devices, or new fundamental fabric blocks minimizes recabling. In an exemplary embodiment, the third configuration in FIG. 7B supports up to 96 Tb/s of redundant capacity.

Figure 8A:
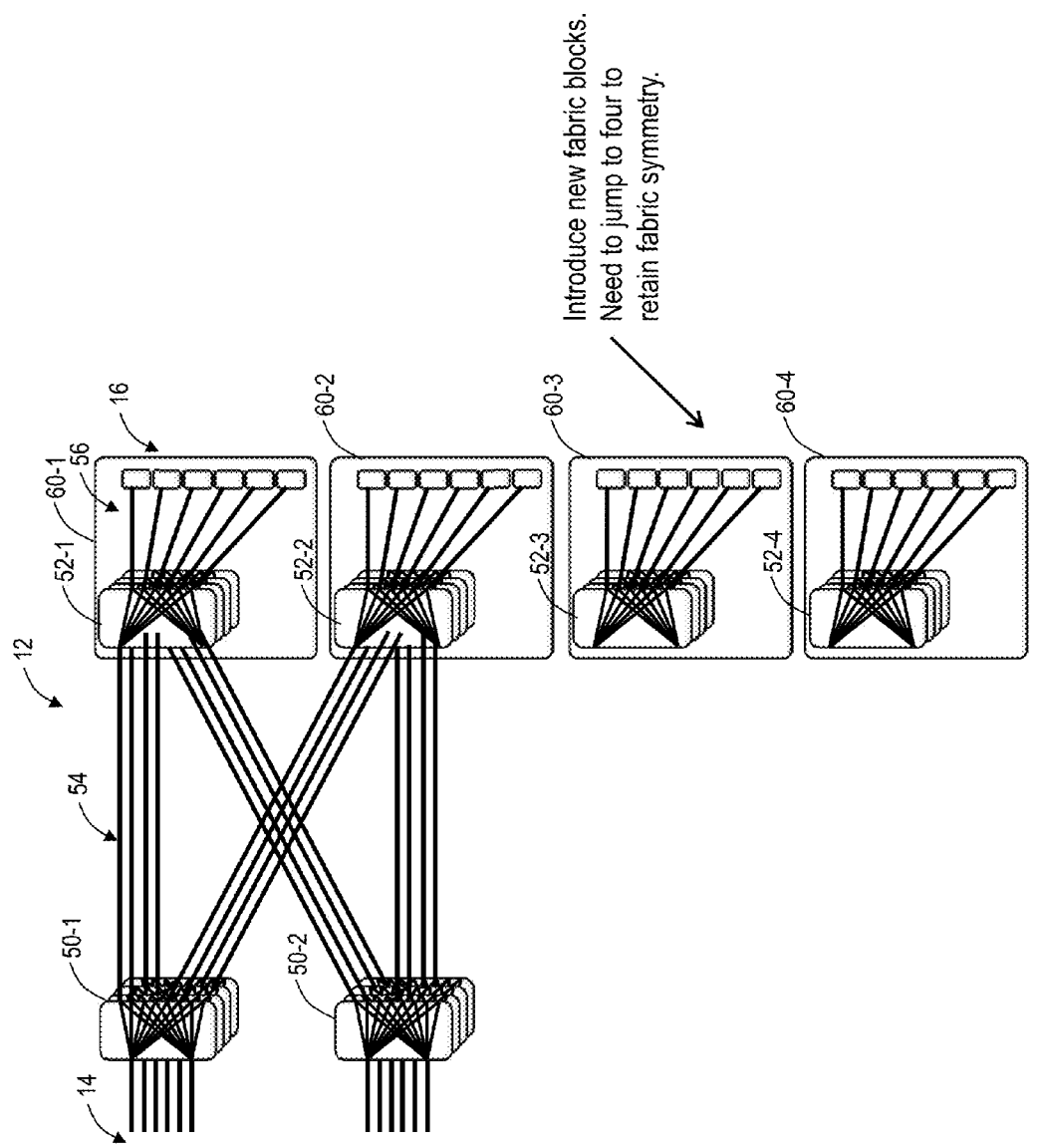
FIGS. 8A-8C are block diagrams of the optical interconnect in a fourth configuration with additional fundamental fabric blocks to support up to 96 ingress/egress switch devices.
Figure 8B:
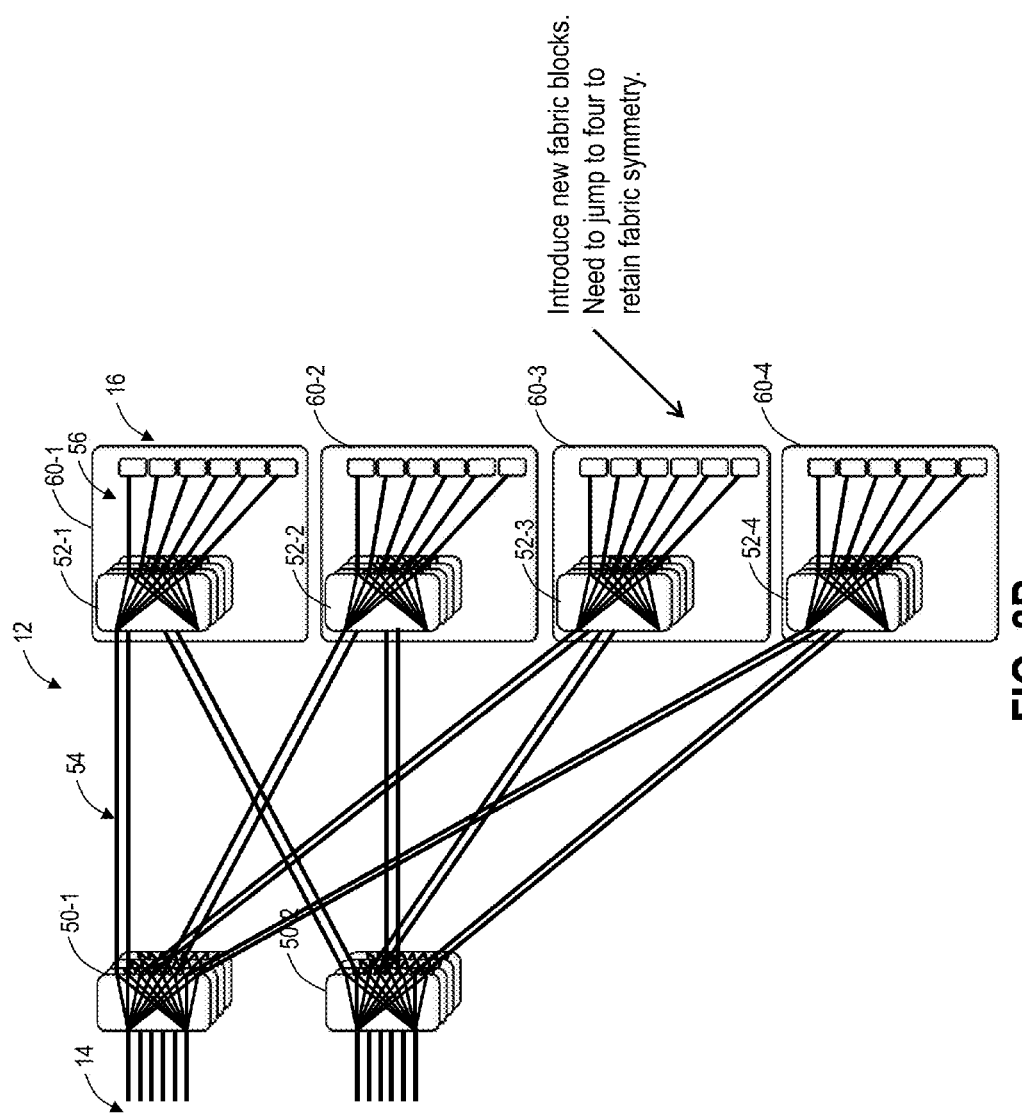
Figure 8C:
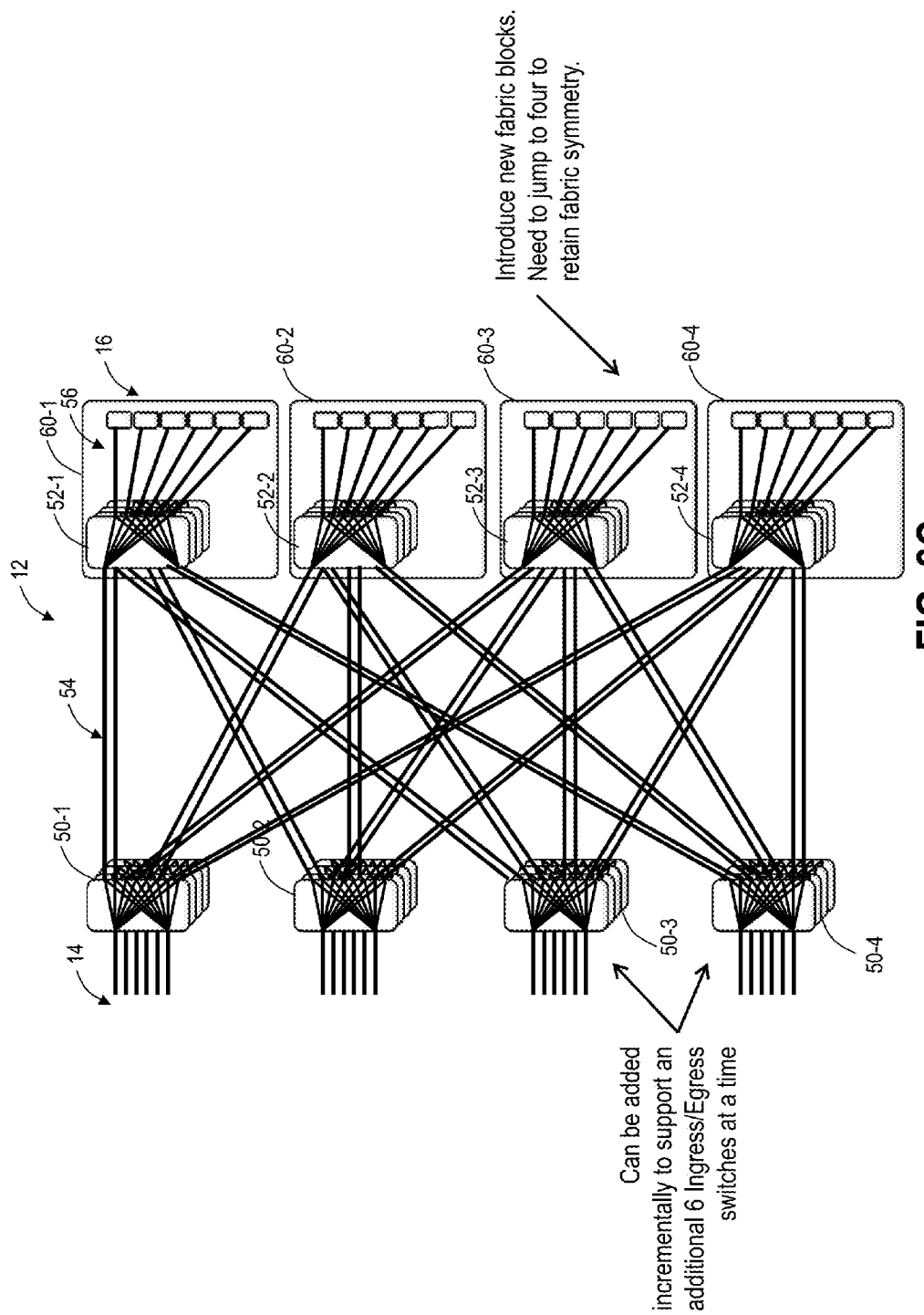

Referring to FIGS. 8A-8C, in an exemplary embodiment, block diagrams illustrate the optical interconnect 12 in a fourth configuration with additional fundamental fabric blocks 60-3, 60-4 to support up to 96 ingress/egress switch element 14 devices. Specifically, FIGS. 8A-8C illustrate an in-service upgrade from the third configuration. In FIG. 8A, the third configuration is shown with two additional fundamental fabric blocks 60-3, 60-4 added. In FIG. 8B, the levels 52-3, 52-4 from the fundamental fabric blocks 60-3, 60-4 are added by moving half of the cables from the levels 50-1, 50-2. In FIG. 8C, up to forty-eight additional (96 total) ingress/egress switch element 14 devices are added to the expanded fabric in the fourth configuration. In an exemplary embodiment, the fourth configuration in FIG. 8C supports up to 192 Tb/s of redundant capacity.

Figure 9:
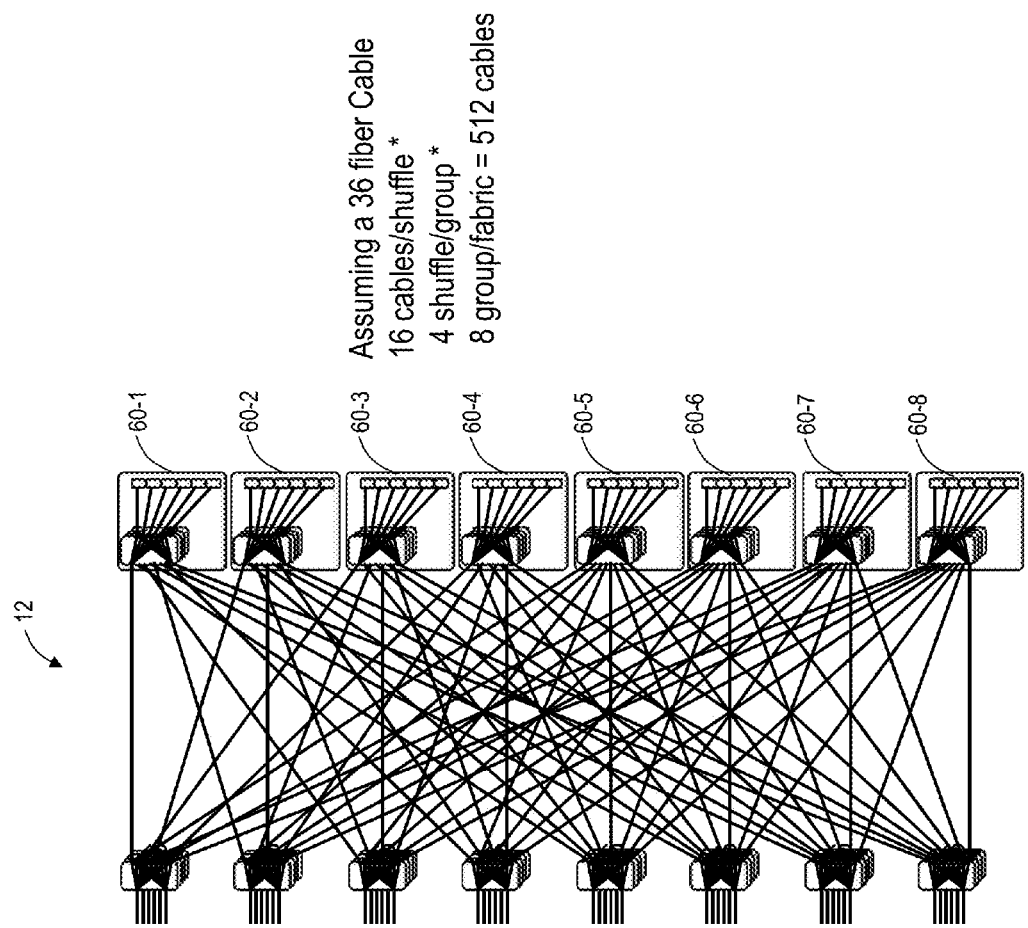
FIG. 9 is a block diagram of the optical interconnect in a fifth configuration with additional fundamental fabric blocks to support up to 192 ingress/egress switch devices.

Referring to FIG. 9, in an exemplary embodiment, a block diagram illustrates the optical interconnect 12 in a fifth configuration with additional fundamental fabric blocks 60-5-60-8 to support up to 192 ingress/egress switch element 14 devices. Again, the fifth configuration can be achieved with the fourth configuration in-service in a similar manner as described above, i.e., with the addition of the fundamental fabric blocks 60-5-60-8 and additional ingress/egress switch element 14 devices. This is done in-service with recabling in the optical interconnects 54 only.

From a cabling perspective, assuming 2 cables (TX+RX) per ingress/egress switch element 14 device (48 fiber MXC/MPO), a number of cables between the ingress/egress switch element 14 and the first level 52 is 8 shuffle×4 planes/shuffle×6 ingress/egress switch element 14/plane×2 cable ingress/egress switch element 14=384 cables. Assuming a 36 fiber Cable, a number of cables can also be 16 cables/shuffle×4 shuffle/group×8 group/fabric=512 cables. Note, without the optical interconnect 12, this implementation of a switch could be over 16,000 cables. This is simply not feasible to manage, upgrade, etc. In an exemplary embodiment, the fifth configuration in FIG. 9 supports up to 384 Tb/s of redundant capacity.

Referring to FIGS. 10A-10D, in an exemplary embodiment, block diagrams illustrate the optical interconnect 12 in a sixth configuration with additional stages in the fundamental fabric blocks. Beyond the fifth configuration (and beyond 384 Tb/s), further growth can be accomplished by adding another stage to the fundamental fabric blocks 60. That is, beyond the fifth configuration, recabling is required in the fundamental blocks 60.

Figure 10A:
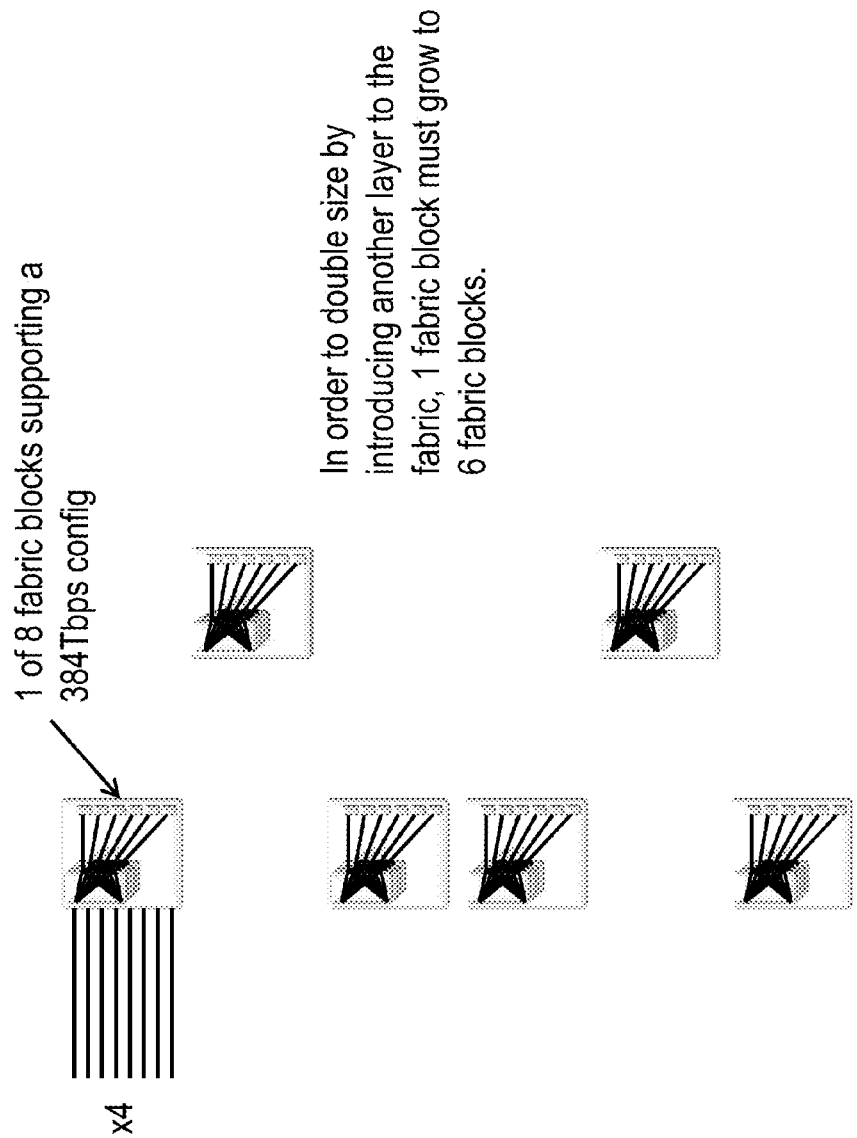
FIGS. 10A-10D are block diagrams of the optical interconnect in a sixth configuration with additional stages in the fundamental fabric blocks.
Figure 10B:
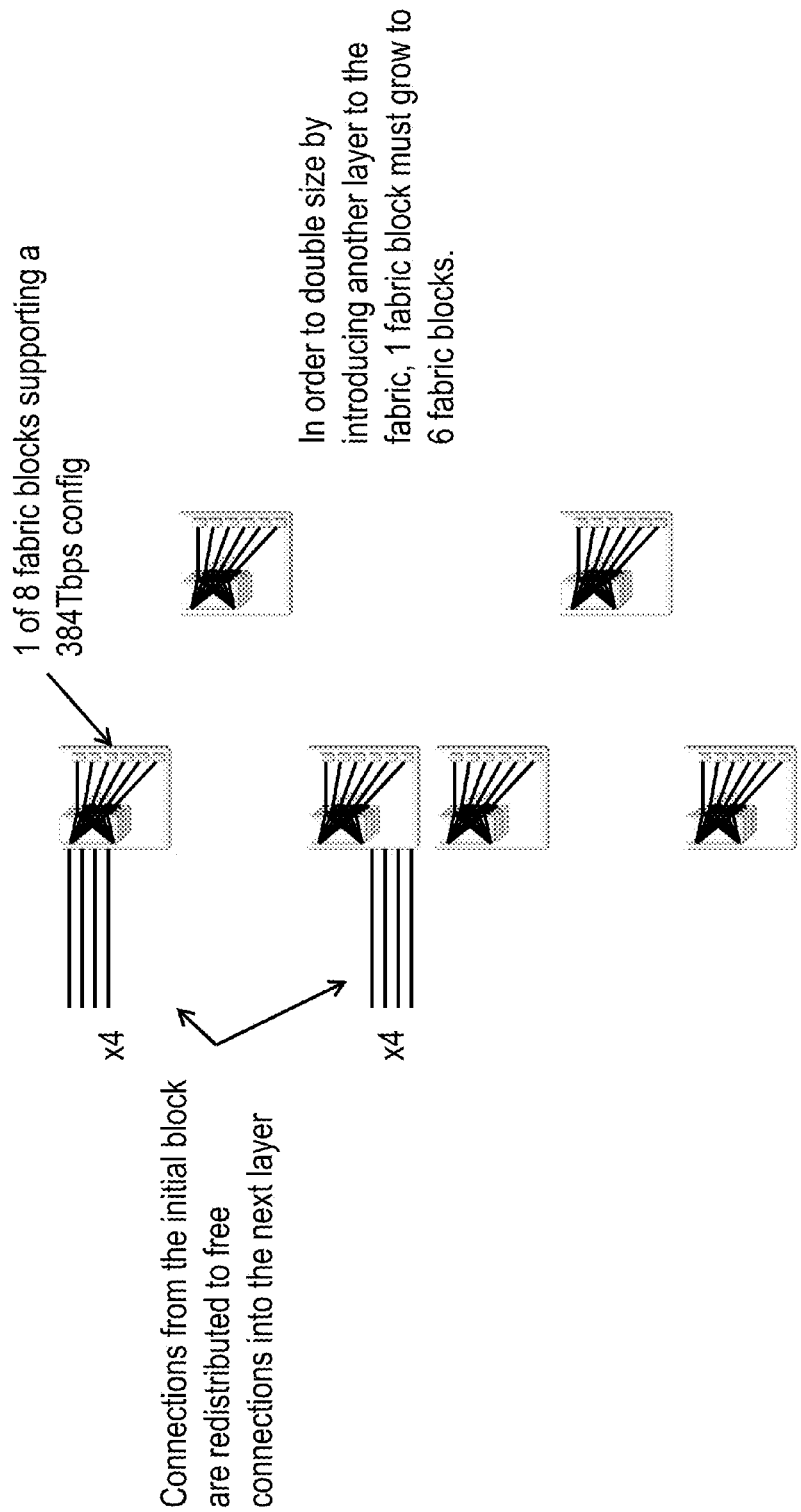
Figure 10C:
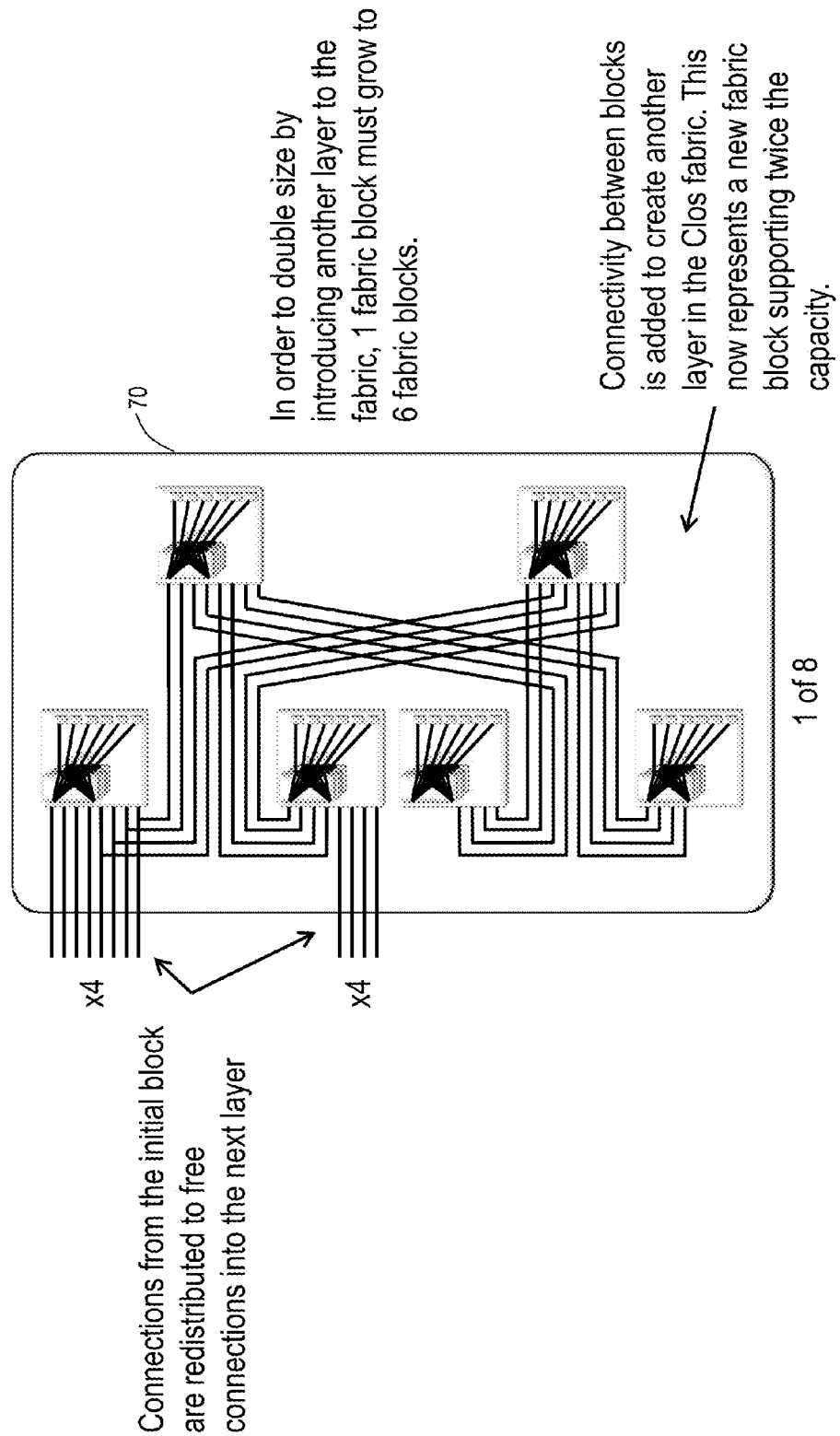
Figure 10D:
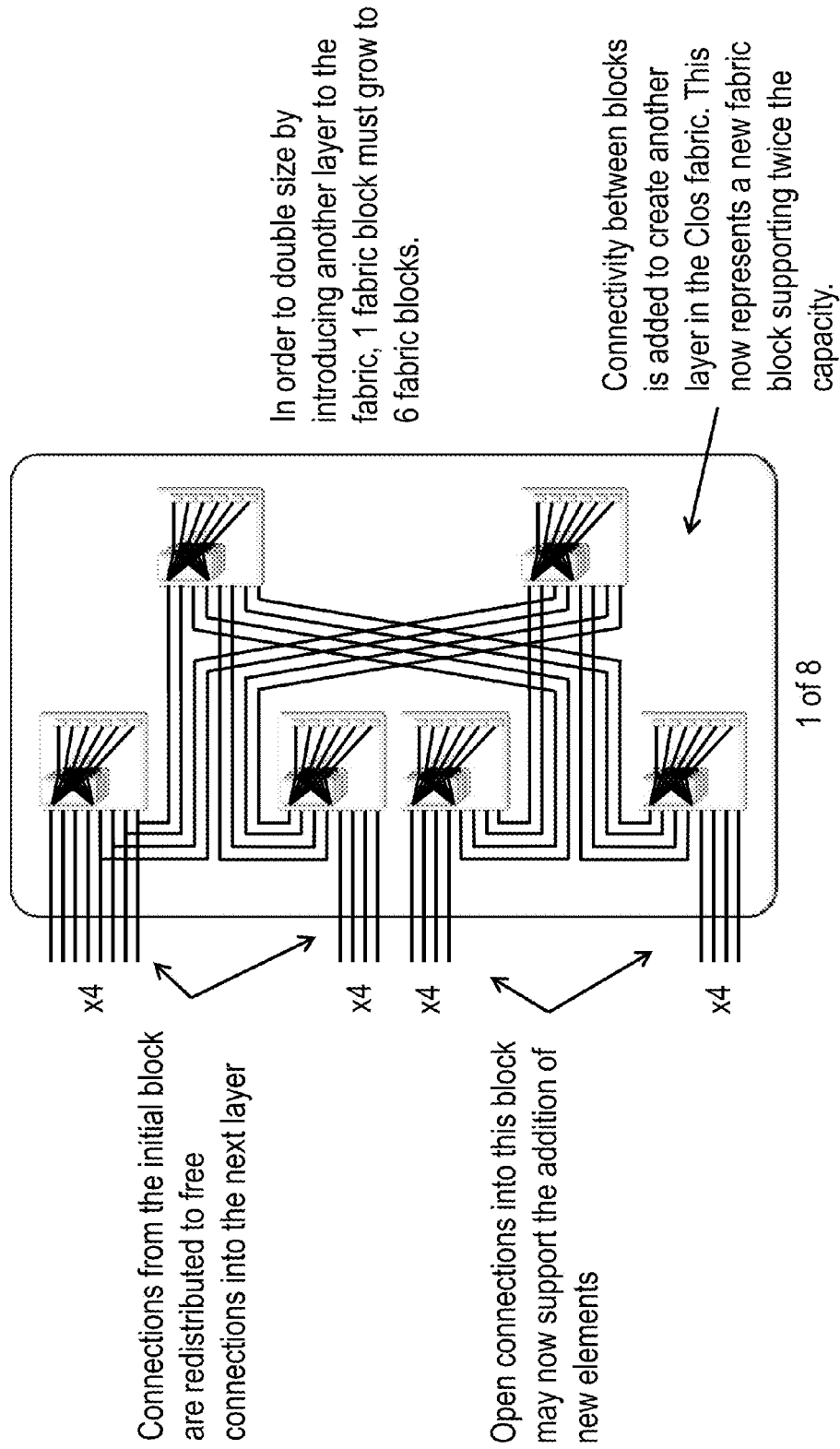

In FIG. 10A, in order to double size, another layer is introduced in the fundamental fabric blocks 60. This represents a transition from a 3-stage Clos to a 5-stage Clos configuration. Specifically to double in size, one fabric block must grow to six fabric blocks. It should be noted that the ability to grow the fabric to its logical limit as 3-stage configuration has put off the commensurate cost/space/power increase represented by this step. In FIG. 10B, the upgrade of the fundamental block 60 is shown where connections from the initial block are redistributed to free connections into the next layer. In FIG. 10C, connectivity is shown between all of the fundamental blocks 60 to add the additional stage. Connectivity between blocks is added to create another layer of the Clos fabric. This now represents a new fundamental block 70 supporting twice the capacity. In FIG. 10D, additional connections are shown to the fundamental block 70 in the optical interconnects 54. In an exemplary embodiment, the sixth configuration in FIG. 10D supports up to 768 Tb/s.

Figure 11:
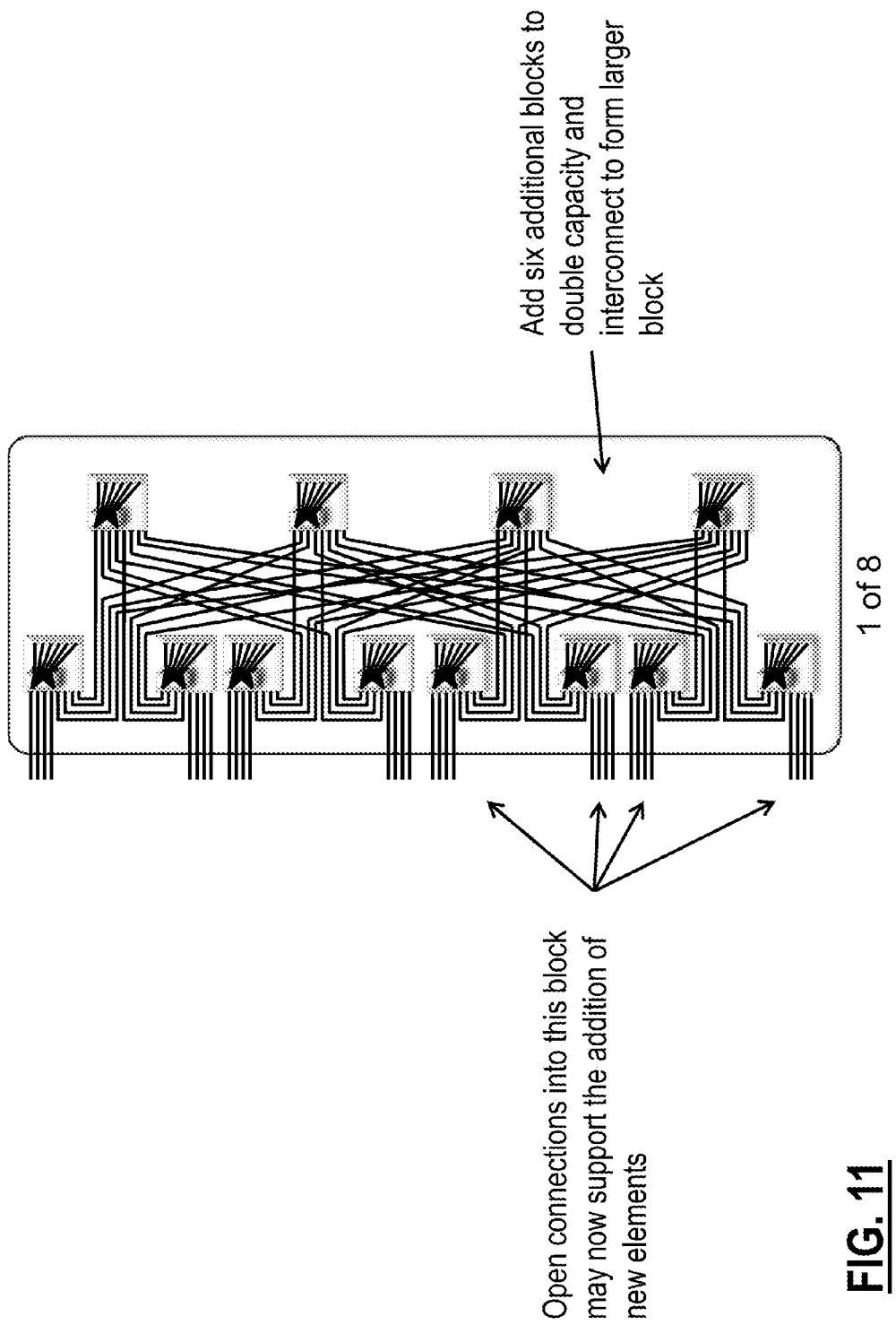
FIG. 11 is a block diagram of the optical interconnect in a seventh configuration with additional fundamental fabric blocks.

Referring to FIG. 11, in an exemplary embodiment, a block diagram illustrates the optical interconnect 12 in a seventh configuration with additional fundamental fabric blocks 70. Compared to the sixth configuration, the seventh configuration can support up to 1536 Tb/s. Thus, the switch 10 can continually be upgraded by ever expanding the optical interconnect 12. This is in-service and performed by adding additional cables, levels 50, 52, stages in the fundamental fabric blocks, etc.

Cabling Implementation

There are a number of physical choices for cabling implementation. In an exemplary embodiment, the optical interconnect 12 could use separate fibers incorporated into a single cable utilizing something like MPO/MXC style connectors to support a single connector termination of many fibers. MPO connectors are Multi-fiber push on connectors which is a single cable containing multiple fibers therein in rows or stacks, e.g., 12, 24, 36, . . . , 72 fibers. The push on connector simultaneously connects all of the multiple fibers. MXC is a similar connector as the MPO connector. Variously, these connectors and cables enable a single cable to simultaneously connect multiple fibers, thereby reducing the cabling requirements in the optical interconnect 12. These may be referred to as ribbon cables, cable bundles, etc.

In another exemplary embodiment, DWDM can be used to put many signals on a single fiber. This approach requires the ability to optically filter signals in the process of the shuffle in the optical interconnect 12. The DWDM approach can be achieved in various physical implementations. Referring to FIGS. 12-17, in various exemplary embodiments, diagrams illustrate using cyclic Arrayed Waveguide Grating (AWG) devices for multiplexing and demultiplexing DWDM signals in the optical interconnect 12. Those of ordinary skill in the art will recognize the DWDM approach can be achieved in various physical implementations and the cyclic AWG is shown for illustration purposes as one exemplary embodiment. FIGS. 12-17 illustrate the use of an 8 skip 0 cyclic AWG 100 demultiplexer which is used to demultiplex wavelengths in a way that the output of that mid-stage shuffle carries appropriately interleaved signals for the illustrated 8 inputs in a way that avoids wavelength contention on the 8 outputs.

Figure 12:
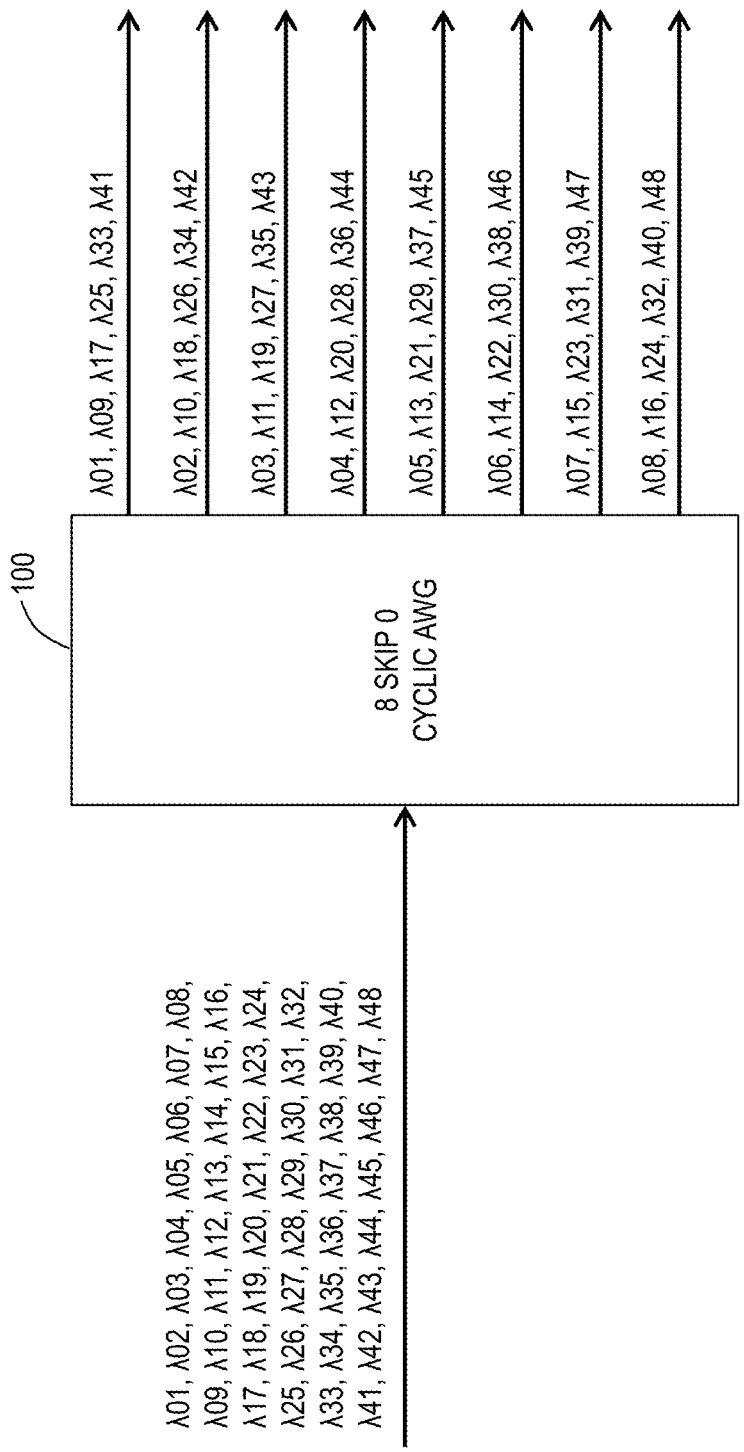
FIG. 12 in a block diagram of 48 wavelengths ($\lambda 01$ to $\lambda 48$) input into a cyclic Arrayed Waveguide Grating (AWG) and the 48 wavelengths are output accordingly on 8 outputs.
Figure 13:
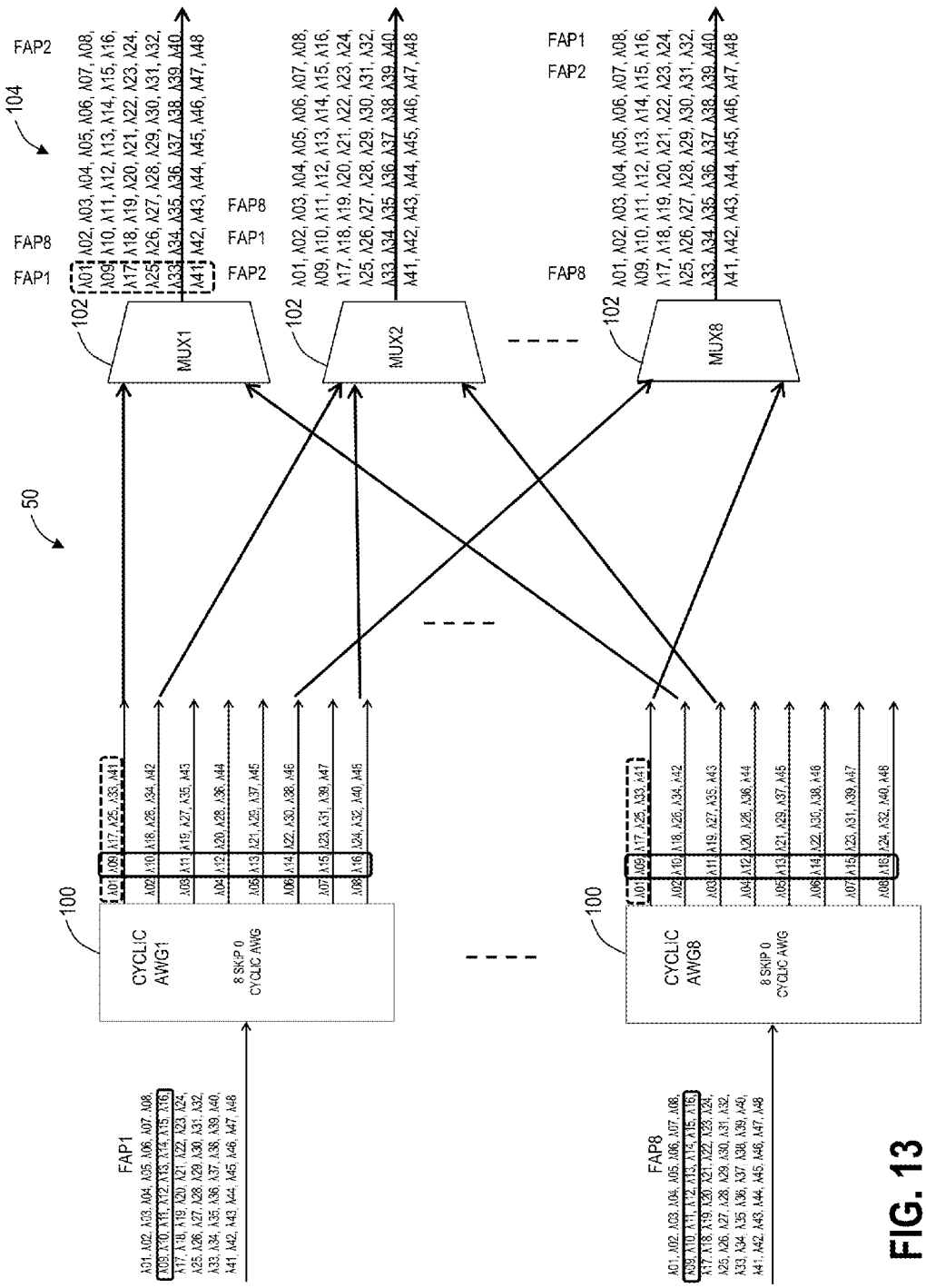
FIG. 13 is a block diagram of the first level of the optical interconnect of FIG. 4 using the cyclic AWG and 48 wavelengths.
Figure 14:
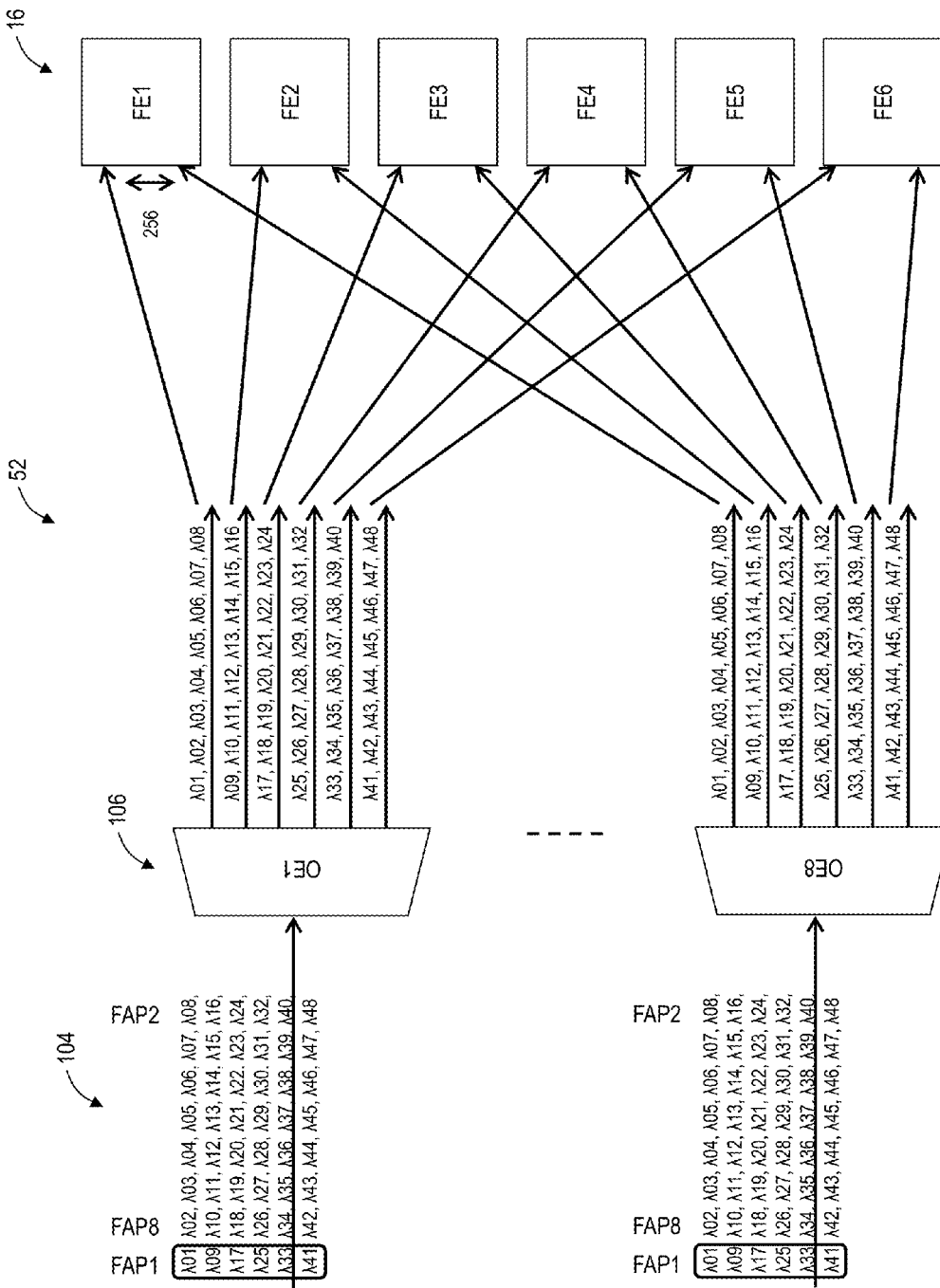
FIG. 14 is a block diagram of the second level of the optical interconnect subsequent to the first level in FIG. 13.

FIGS. 12-14 illustrate a 48 wavelength example using the cyclic AWG 100. FIG. 12 illustrates 48 wavelengths ($\lambda 01$ to $\lambda 48$) input into the cyclic AWG 100, and the 48 wavelengths are output accordingly as shown in FIG. 12 on 8 outputs. FIG. 13 illustrates the first level 50 of the optical interconnect 12 using the cyclic AWG 100 and 48 wavelengths. Here, there are 8 cyclic AWGs 100 shown, each connected to an ingress/egress switch 14 (not shown) and receiving 48 wavelengths therefrom. For example, the ingress/egress switch 14 can be a Broadcom Fabric Access Processor (FAP). The 8 outputs for each cyclic AWG 100 are each connected to one of 8 multiplexers 102 which combines 6 wavelengths from each cyclic AWG 100 into a total of 48 wavelengths. Thus, after the multiplexers 102, each output 104 includes a total of 48 wavelengths with 6 wavelengths from each of the 8 ingress/egress switches 14.

FIG. 14 illustrates the second level 52 of the optical interconnect subsequent to the first level 50 in FIG. 13. It is a bit nuanced, but the choice of 48 wavelengths from 8 ingress/egress switches 14 is more difficult to optically shuffle at the fabric stage, the second stage 52. It can be done without wavelength contention, but is a bit complicated to do so. In this example in FIG. 14, there are 8 optical-electrical (OE) devices 106 each receiving one of the outputs 104 from the multiplexers 102 and providing 8 wavelengths to each of 6 center stage switch elements 16 (which can, for example, be Broadcom Fabric Elements (FEs)). The OE devices 106 can be optical receivers and electrical transmitters such that the 48 wavelength input gets terminated and then the resulting electrical signals are electrically shuffled to the center stage switch elements 16.

Figure 15:
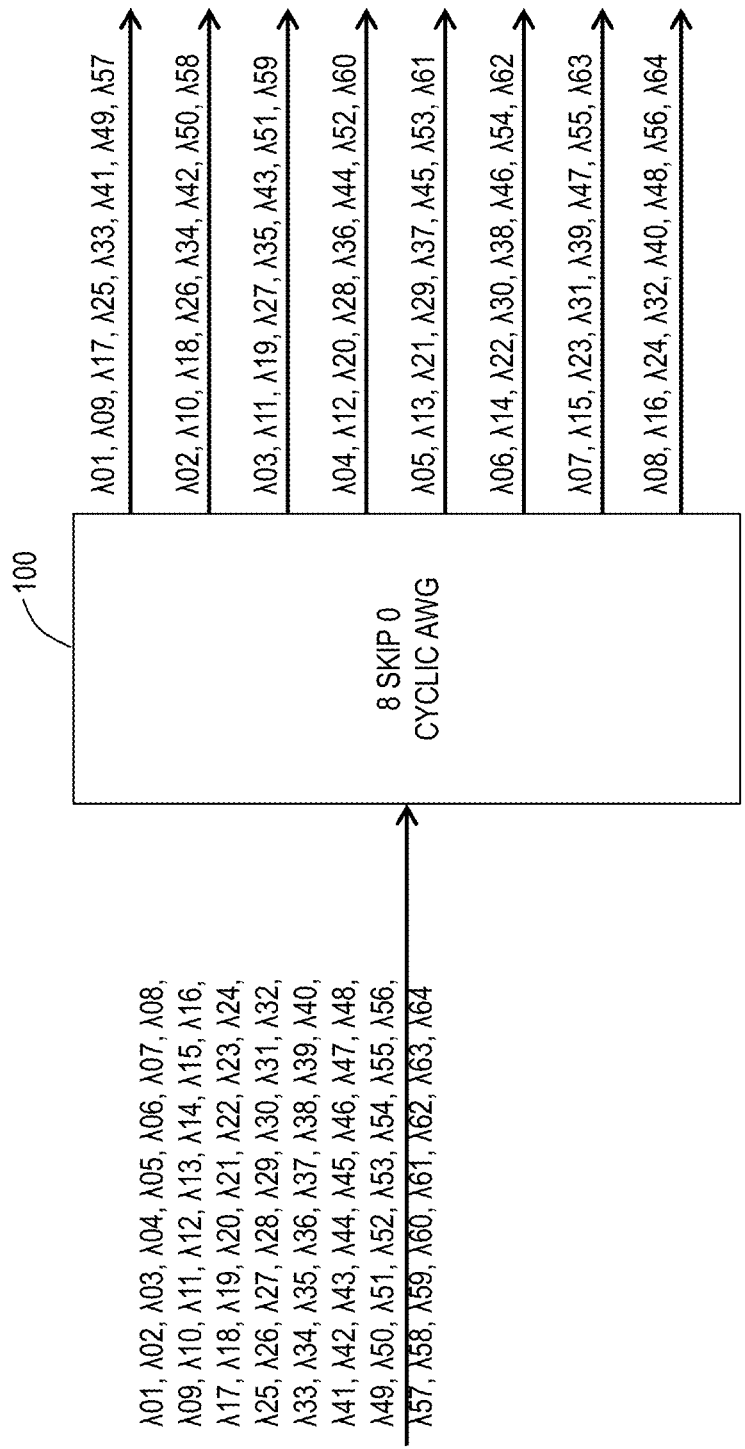
FIG. 15 in a block diagram of 64 wavelengths ($\lambda 01$ to $\lambda 64$) input into the cyclic AWG and the 64 wavelengths are output accordingly on 8 outputs.
Figure 16:
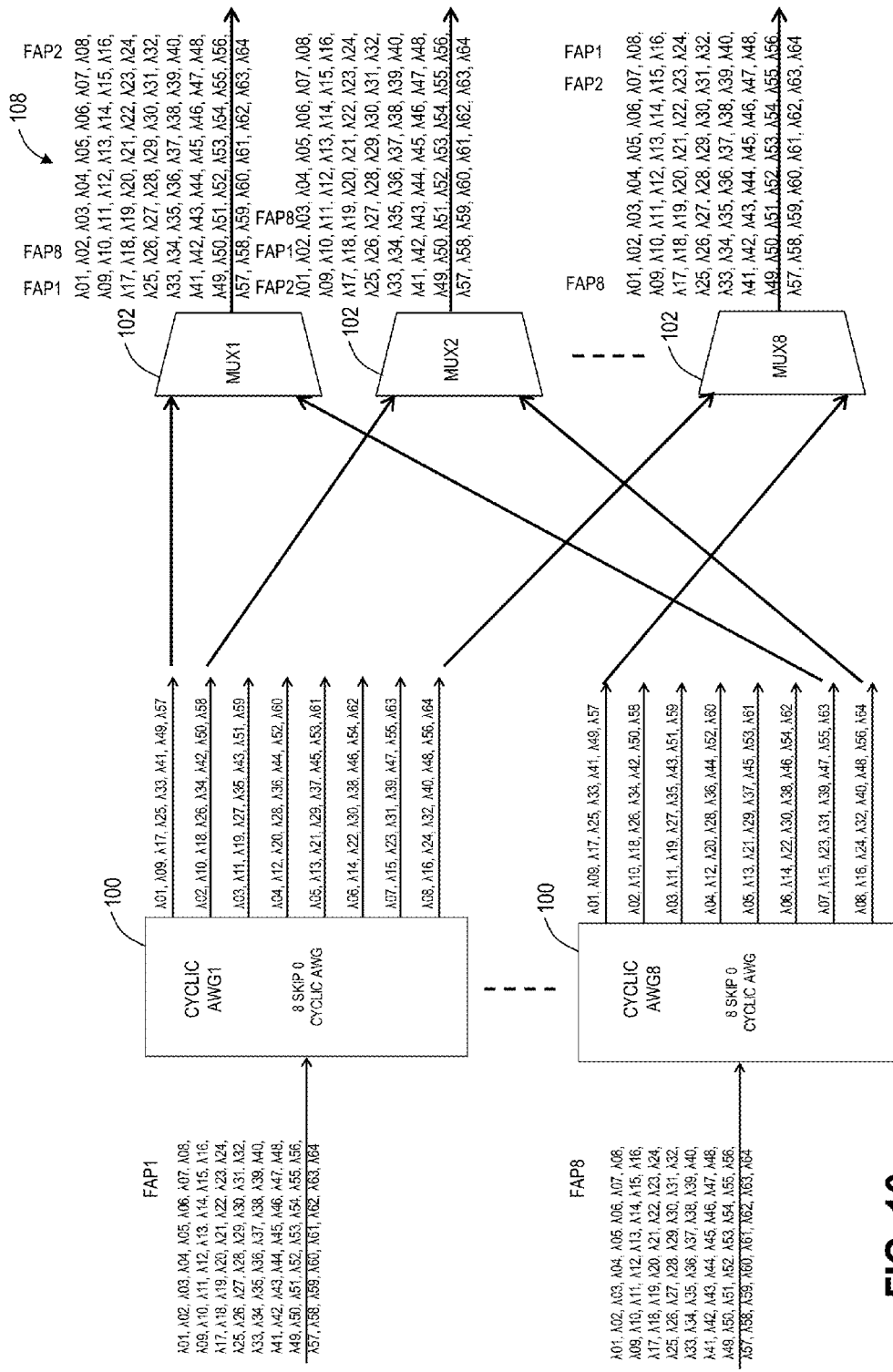
FIG. 16 is a block diagram of the first level of the optical interconnect of FIG. 4 using the cyclic AWG and 64 wavelengths.
Figure 17:
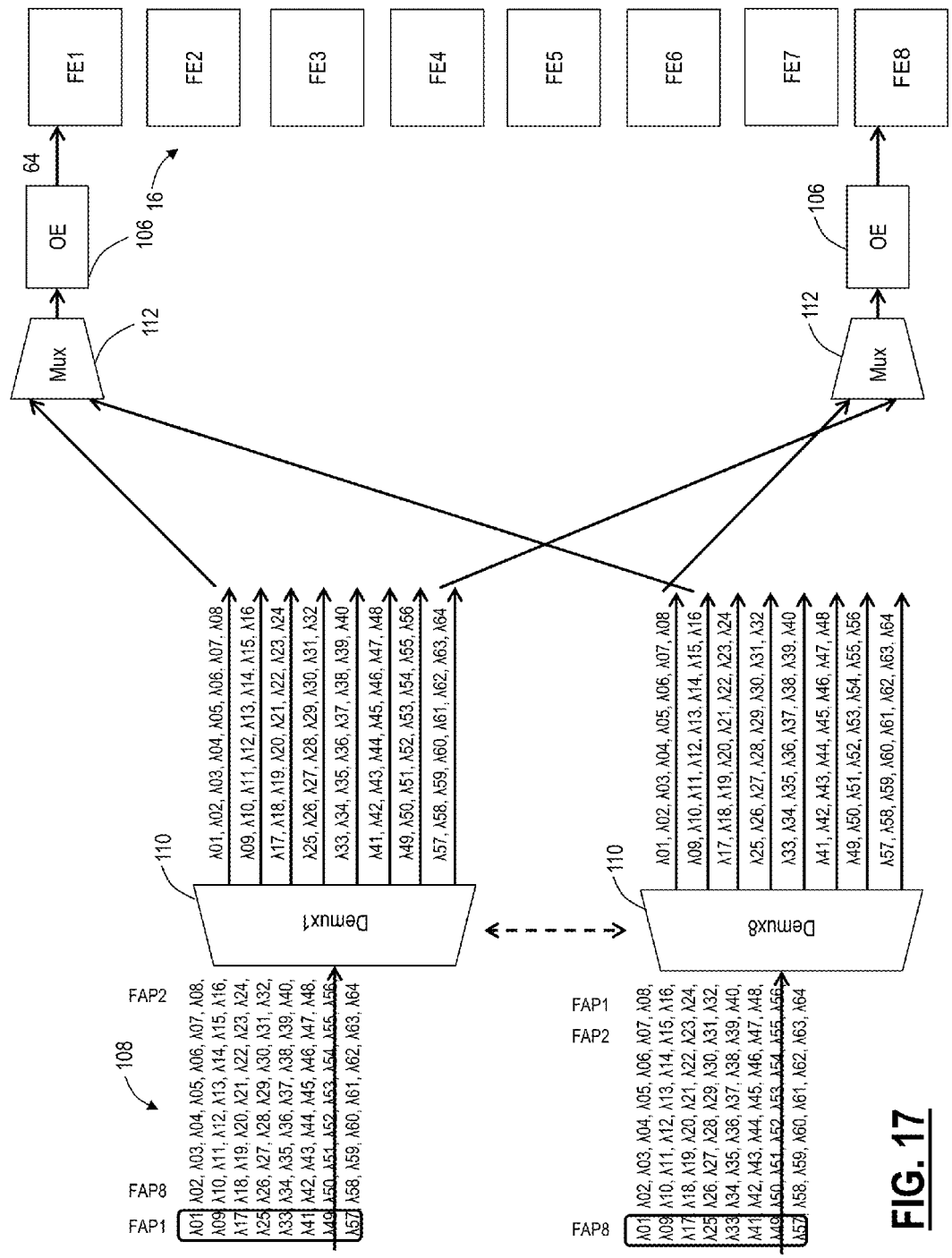
FIG. 17 is a block diagram of the second level of the optical interconnect subsequent to the first level in FIG. 16.

FIGS. 15-17 illustrate a 64 wavelength example using the cyclic AWG 100. FIG. 12 illustrates 64 wavelengths ($\lambda 01$ to $\lambda 64$) input into the cyclic AWG 100, and the 64 wavelengths are output accordingly as shown in FIG. 15 on 8 outputs. FIG. 16 illustrates the first level 50 of the optical interconnect 12 using the cyclic AWG 100 and 64 wavelengths. Here, there are 8 cyclic AWGs 100 shown, each connected to an ingress/egress switch 14 (not shown) and receiving 64 wavelengths therefrom. The ingress/egress switch 14 can, for example, be a Broadcom Fabric Access Processor (FAP). The 8 outputs for each cyclic AWG 100 are each connected to one of 8 multiplexers 102 which combines 8 wavelengths from each cyclic AWG 100 into a total of 64 wavelengths. Thus, after the multiplexers 102, each output 108 includes a total of 64 wavelengths with 8 wavelengths from each of the 8 ingress/egress switches 14.

FIG. 17 illustrates the second level 52 of the optical interconnect subsequent to the first level 50 in FIG. 16. In this example in FIG. 17, there are 8 demultiplexers 110 each receiving one of the 8 outputs 108 and splitting the 64 wavelengths into groups of 8 sequential wavelengths as shown in FIG. 17 which are each provided to one of 8 multiplexers 112. The multiplexers 112 combine 8 wavelengths from each of the 8 demultiplexers 110 and provide a total of 64 wavelengths to an associated center stage switch element 16 (FE). There can be an OE device 106 in front of the center stage switch element 16. Also, it is expected that the center stage switch elements 16 will in the future be capable of incorporation of the OE device 106 directly within its package such as via Silicon Photonic integration.

The ability to perform the shuffle/distribution of signals optically is required to take full advantage of such incorporation.

Disaggregated Switch Interconnect

Figure 18:
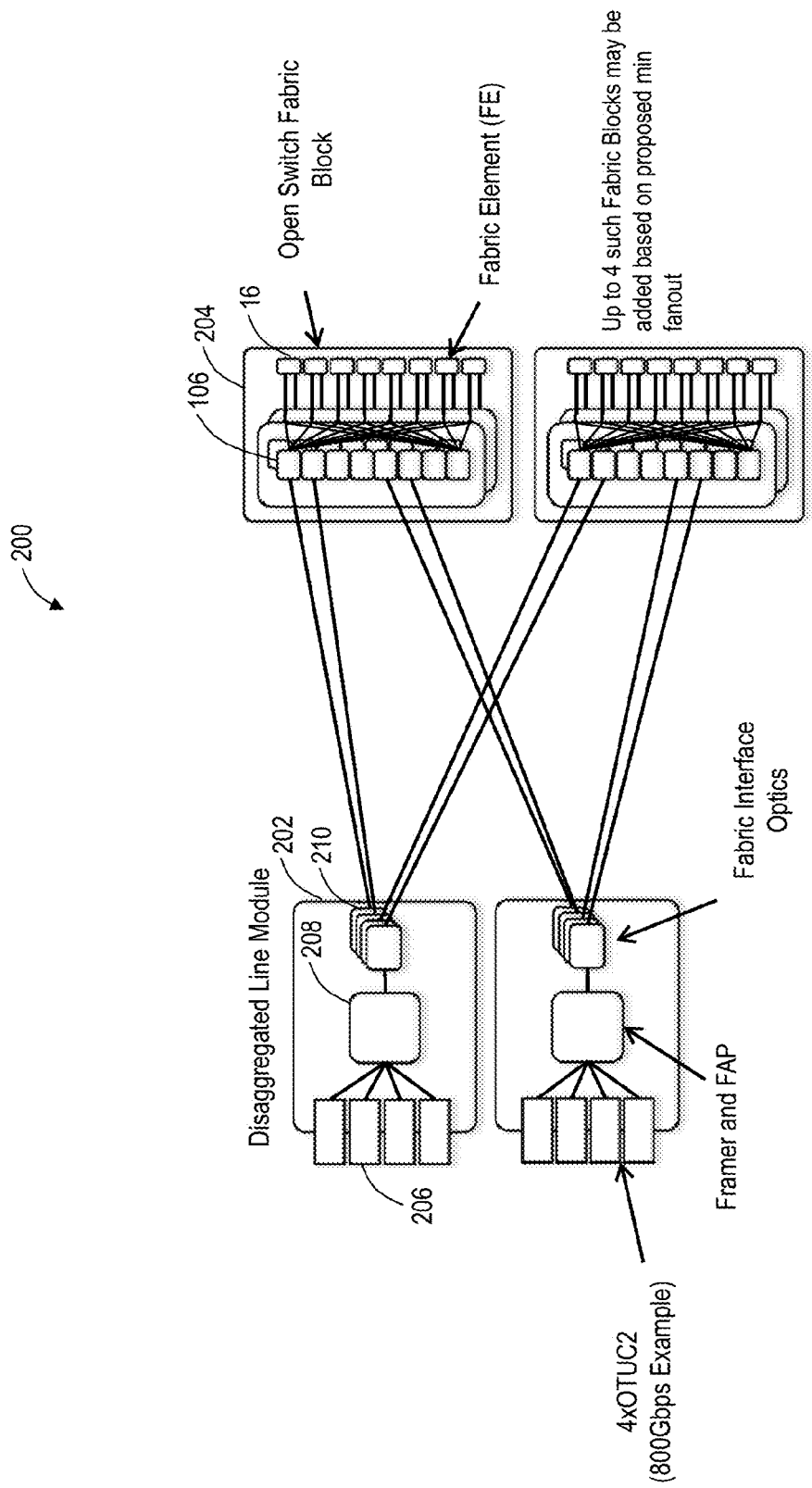
FIG. 18 is a block diagram of an open switch fabric with disaggregated line modules optically coupled to open switch fabric blocks.

Referring to FIGS. 18-27, in various exemplary embodiments, diagrams illustrate a switch fabric 200 block including 8 Fabric Elements (FE) to provide up to 38.4 Tbps of redundant Packet/OTN switching capacity with the advent of 50 G capable SERDES. In this example, 8 FE represent 192×50×8 76.8 Tbps of total capacity or 67.2 Tbps of 1:7 redundant capacity. FIG. 18 illustrates the switch fabric 200 with disaggregated line modules 202 optically coupled to open switch fabric blocks 204. The switch fabric 200 is characterized as disaggregated in that connectivity between the line modules 202 and the switch fabric blocks 204 is optical, not via an electrical backplane. The disaggregated line modules 202 include client interfaces 206 which can be optical interfaces, e.g., OTN such as 4×OTUC2 (Optical channel Transport Unit C2) for a total of 800 Gbps. The client interfaces 206 connect to a framer and processing circuitry 208 which connect to fabric interface optics 210.

In the switch fabric 200, the mid-stage shuffle (the first level 50) is removed in the optical interconnect 12 and the fabric interface optics 210 connect to OE devices 106 which electrically distributes the connections from the fabric interface optics 210 to center stage switches 16 (FEs). For example, to satisfy 64 signals from the framer and processing circuitry 208, eight different OE devices 106 of 8 wavelengths each is used. Such devices are expected to be built to support 400 GbE applications which utilize 8×50 G wavelengths. The mid-stage shuffle is then achieved by manipulation of the fiber and where it plugs in. The fabric shuffle is then performed electrically through the use of orthogonal direct connectors.

The choice of 8 center stage switches 16 defines a minimum interconnect quanta of N×8 SERDES. This choice is driven by the availability of optics which may interconnect today in multiples of 4×25 G and the anticipated introduction of optics based on 8×50 G. If fabric expansion is desired beyond 38.4 Tbps, the minimum number of SERDES must increase. Expansion to four fabric blocks, 153.6 Tbps, is possible with a minimum fanout of four interfaces including 8 SERDES each.

Figure 19:
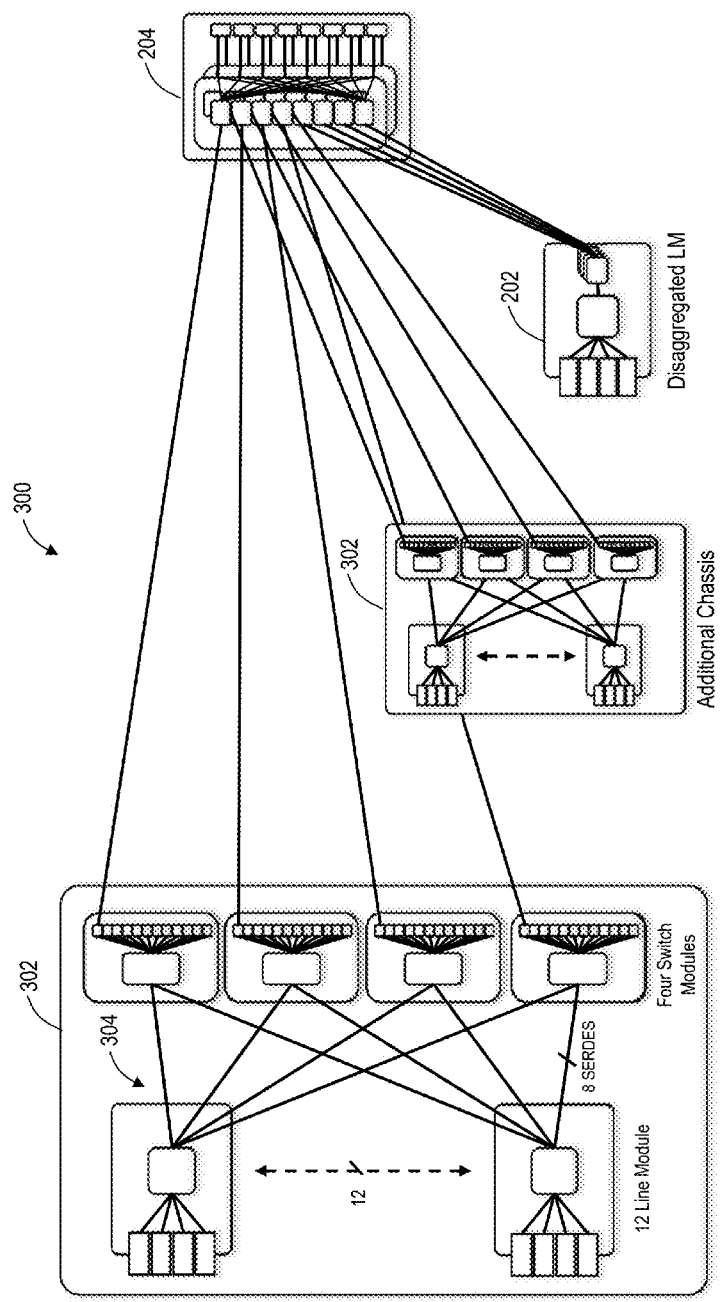
FIG. 19 is a block diagram illustrates an upgraded switch fabric which combines an existing switch with an electrical backplane to the open switch fabric of FIG. 18.

Referring to FIG. 19, in an exemplary embodiment, a block diagram illustrates an upgraded switch fabric 300 which combines an existing switch 302 with an electrical backplane to the switch fabric 200. As most existing switches use an electrical backplane, it may be desirable to start with a chassis based fabric using an electrical backplane and upgrade to the switch fabric 200. The example of FIG. 19 includes two existing switches 302 which include line modules and switch modules which connect to one another via an electrical backplane 304. For example, the switch 302 can include 12 line modules, 4 switch modules, and 8 SERDES between each line module and switch module. To upgrade, the switch fabric block 204 is added with the switch modules from the switch 302 connecting to the OE devices 106 along with new disaggregated line modules 202 added as well. The upgraded switch fabric 300 scales through the introduction of the switch chassis which may interconnect a combination of chassis-based system and disaggregated line modules 202. In an exemplary embodiment, the upgraded switch fabric 300 can scale to up to 16×Chassis/192 line modules based on fanout constraint of four imposed by minimum size for the disaggregated line modules 202.

Figure 20:
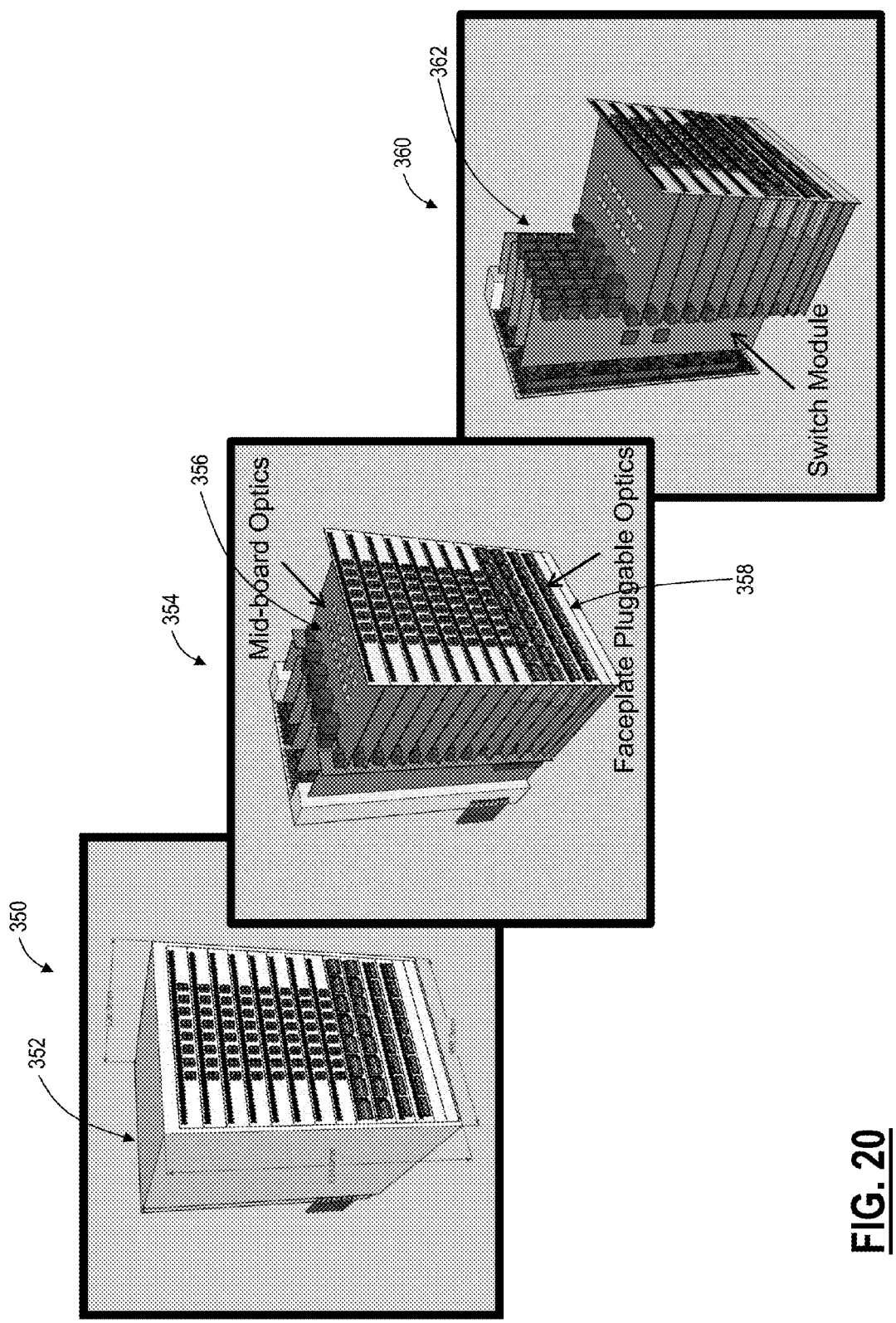
FIG. 20 is perspective diagrams of a physical implementation of the open switch fabric of FIG. 18.

Referring to FIG. 20, in an exemplary embodiment, perspective diagrams illustrate a physical implementation of the switch fabric 200. A first view 350 illustrates the switch fabric 200 in a chassis 352 which can be housed in a 19-inch rack with about 12-14 Rack Units (RUs) height. A second view 354 illustrates a housing of the chassis 352 removed showing internal components. The switch fabric 200 can include mid-board optics 356 and faceplate pluggable optics 358. A third view 360 illustrates Orthogonal Direct Connectors 362 between switch modules and the optics, for the OE devices 106. The Orthogonal Direct Connectors 362 eliminate a large backplane and allow the direct front to back airflow. In an exemplary embodiment, this physical implementation can include 38.4 Tbps with Mid-Board Optics (16×400 G) and 19.2 Tbps with faceplate pluggable Optics (8×400 G or 32×100 G).

Figure 21:
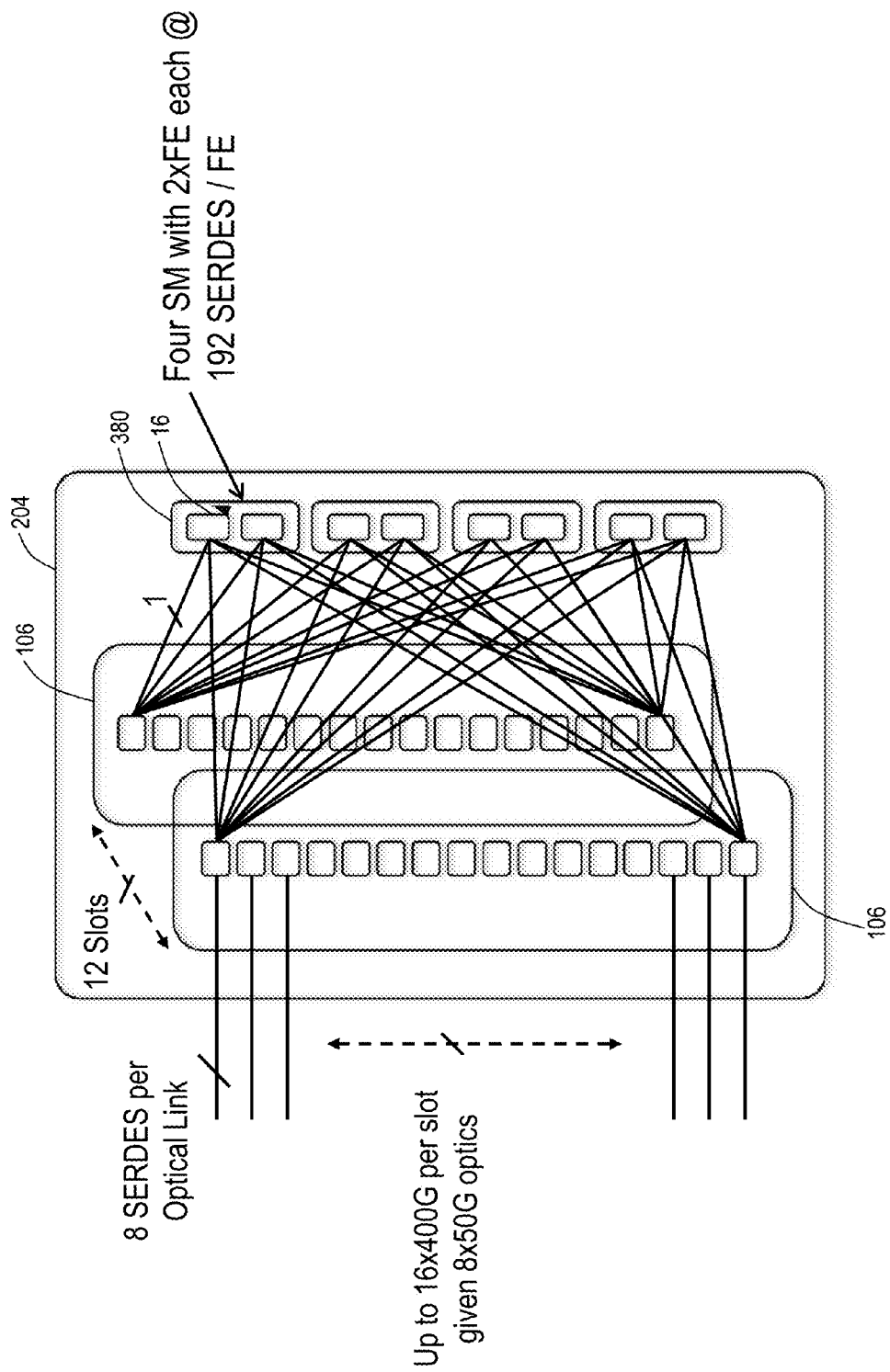
FIG. 21 is a block diagram of details of the open switch fabric block with 12 slots in the open switch fabric of FIG. 18.

Referring to FIG. 21, in an exemplary embodiment, a block diagram illustrates details of the open switch fabric block 204 with 12 slots. In an exemplary embodiment, the open switch fabric block 204 includes 12 slots of the OE devices 106 with up to 16×400 G per slot given 8×50 G optics and 8 SERDES per optical link. There can be four switch modules 380 with two center stage switches 16 (FEs) each with 192 SERDES per center stage switch 16. This implementation can include 16 Interfaces/Module×8 SERDES/Interface×12 Slots/Chassis=1,536 SERDES/Chassis; 192 SERDES/FE×8 FE/Chassis=1,536 SERDES/Chassis; and 1,536 SERDES/Chassis×50 Gbps/SERDES×0.75 redundancy×2/3 Fabric Overspeed=38.4 Tbps.

Figure 22:
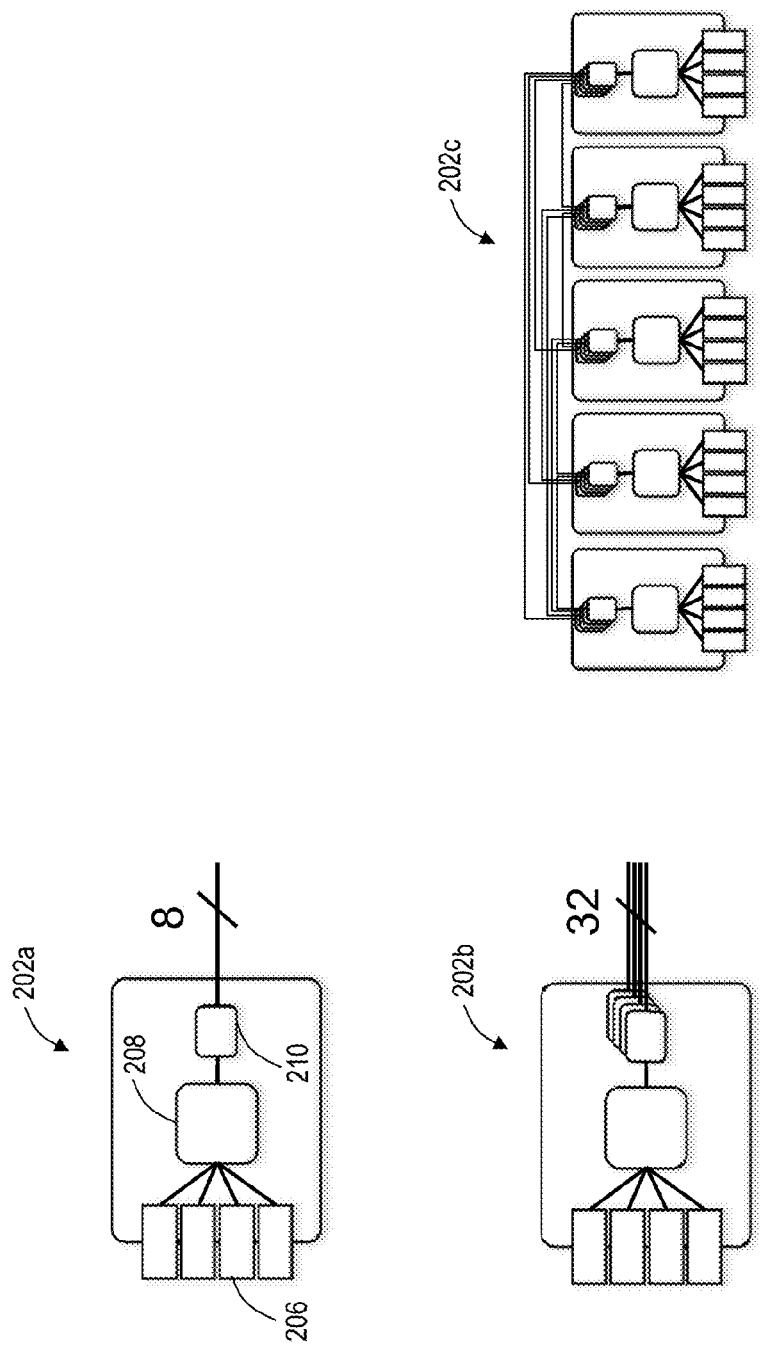
FIG. 22 is a block diagram of exemplary implementations of the disaggregated line modules in the open switch fabric of FIG. 18.

Referring to FIG. 22, in an exemplary embodiment, a block diagram illustrates exemplary implementations of the disaggregated line modules 202a, 202b. In a line module 202a, there are 8 SERDES providing a minimum sized module of 200 Gbps. The fanout of one interface at 8 SERDES limits the ability to interconnect to fabric beyond one fabric block. In a line module 202b, there are 32 SERDES providing a minimum sized module of 800 Gbps. Here, fanout of four interfaces of 8 SERDES each allows the ability to scale to four fabric blocks. The disaggregated line modules 202 can also be in a mesh interconnection 202c to provide mesh interconnect to 1 Tbps.

Figure 23:
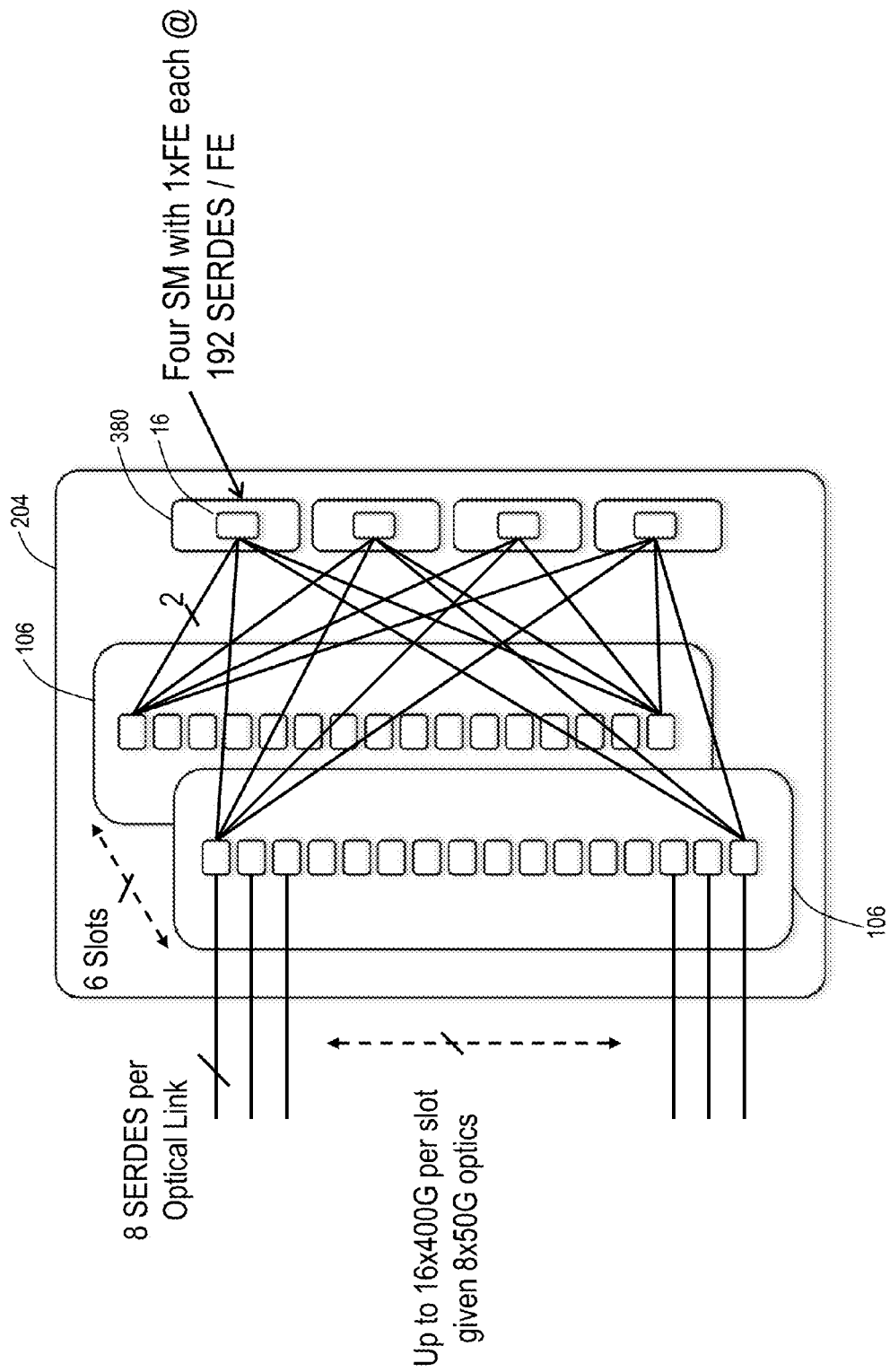
FIG. 23 is a block diagram of details of the open switch fabric block with 6 slots in the open switch fabric of FIG. 18.

Referring to FIG. 23, in an exemplary embodiment, a block diagram illustrates details of the open switch fabric block 204 with 6 slots. In an exemplary embodiment, the open switch fabric block 204 includes 6 slots of the OE devices 106 with up to 16×400 G per slot given 8×50 G optics and 8 SERDES per optical link. There can be four switch modules 380 with one center stage switch 16 (FEs) each with 192 SERDES per center stage switch 16. This implementation can include 16 Interfaces/Module×8 SERDES/Interface×6 Slots/Chassis=768 SERDES/Chassis; 192 SERDES/FE×4 FE/Chassis=768 SERDES/Chassis; 768 SERDES/Chassis×50 Gbps/SERDES×0.75 redundancy×2/3 Fabric Overspeed=19.2 Tbps.

Figure 24:
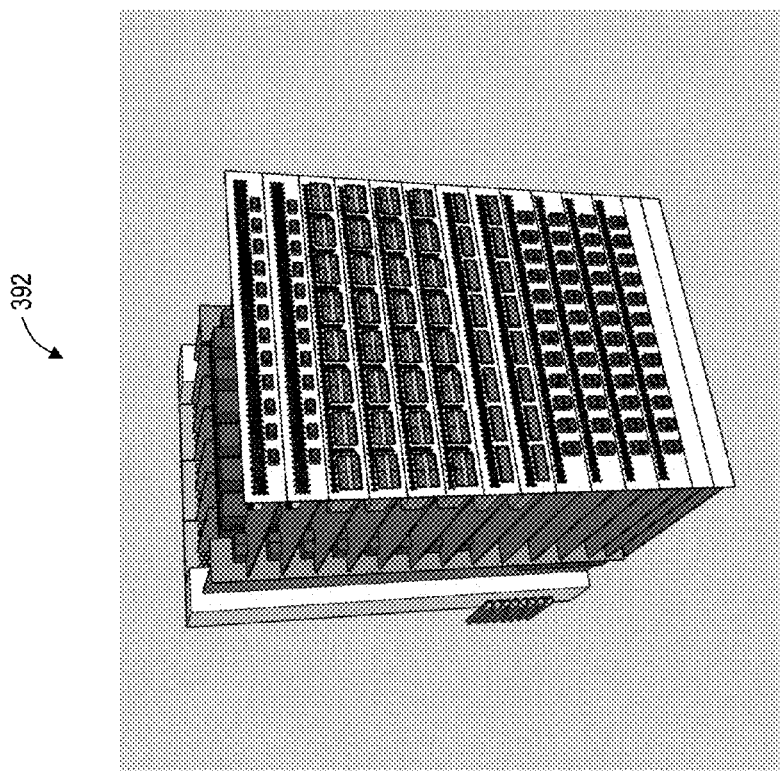
FIG. 24 is perspective diagrams of a physical implementation of the open switch fabric with orthogonal direct connectors to eliminate a backplane.
Figure 24:
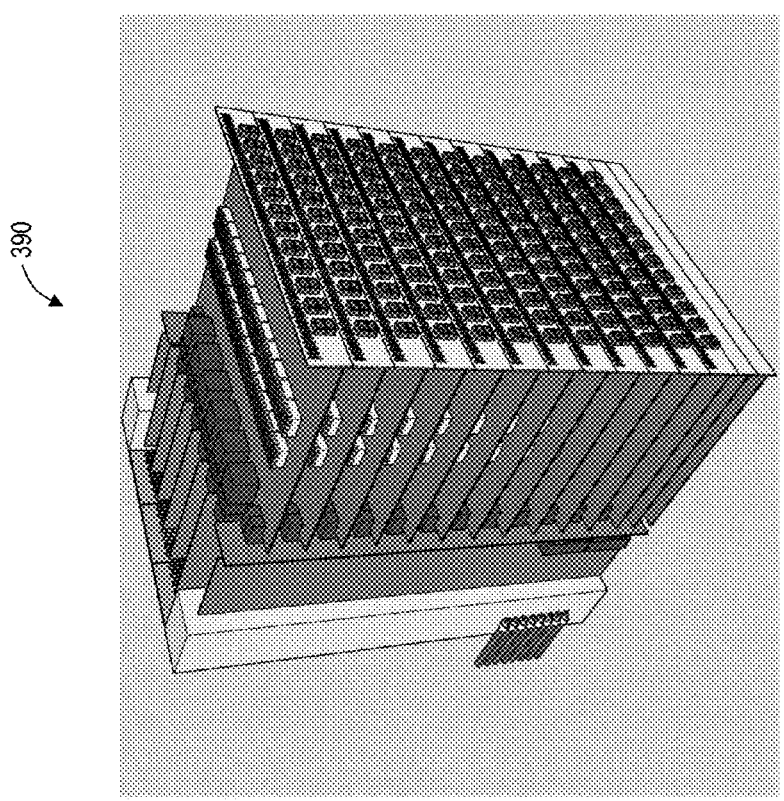

Referring to FIG. 24, in an exemplary embodiment, perspective diagrams illustrate a physical implementation of the switch fabric 200 with orthogonal direct connectors to eliminate a backplane. As illustrated in FIG. 24, this physical implementation is capable of 6.4 Tbps/slot and 76.8 Tbps/shelf. A first view 390 includes a pure fabric solution with optical interconnect to disaggregated line modules 202 and a second view 392 includes the fabric with integrated line modules and optical interconnect to disaggregated line modules or added fabric stage.

Figure 25:
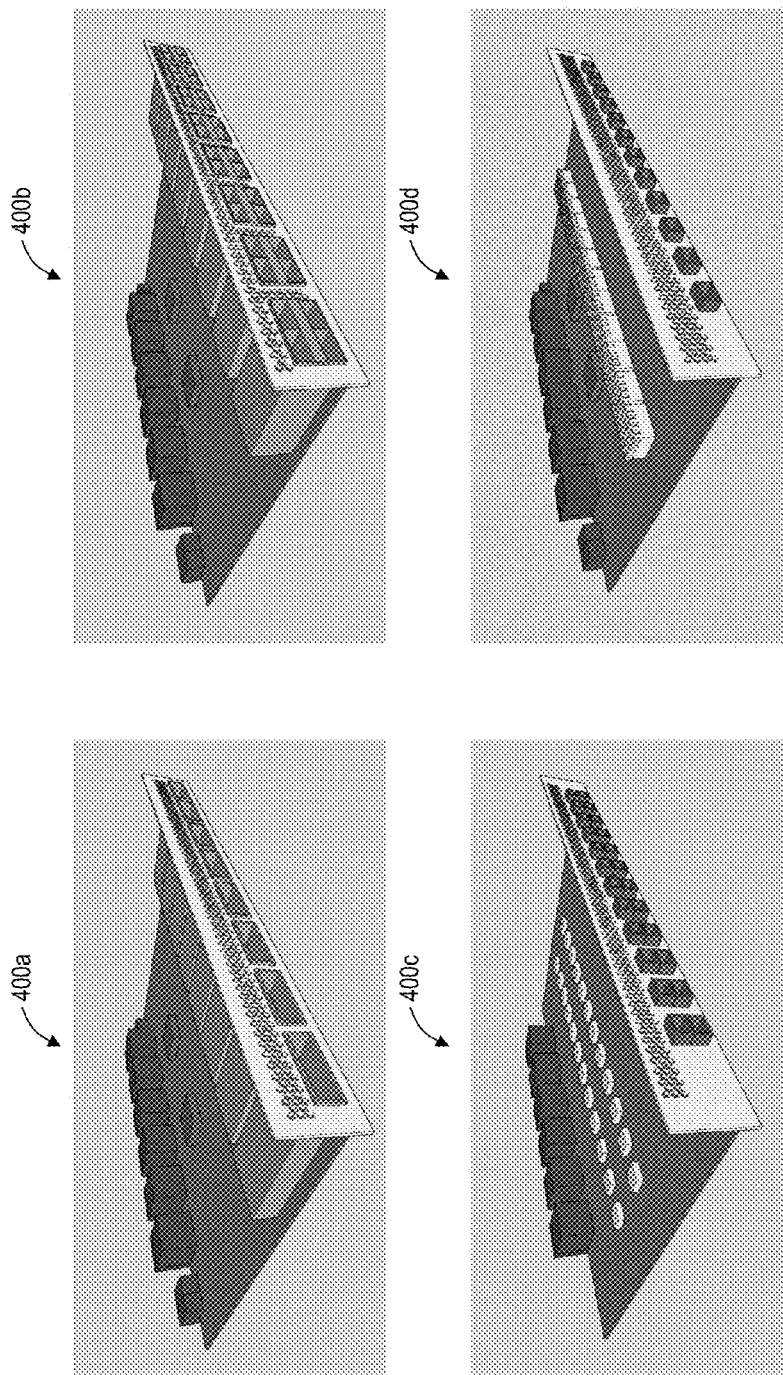
FIG. 25 is various perspective diagrams of integrated line modules used in the physical implementations of FIGS. 20 and 24.

Referring to FIG. 25, in an exemplary embodiment, various perspective diagrams illustrate integrated line modules 400a, 400b, 400c, 400d used in the physical implementations of FIGS. 20 and 24. The integrated line module 400a can be 8×400 G CFP8 (3.2 Tbps), the integrated line module 400b can be 32×100 G QSFP28 (3.2 Tbps), the integrated line module 400c can be 24×400 G Mid Board Optics with Fabric Expansion/External Line Module (6.4+ Tbps), and the integrated line module 400d can be 12×400 G Mid Board Optics (4.8 Tbps Oversubscribed Packet).

An optics only line module can be used to provide an open interface into the fabric through which external "pizza box" line modules may interface directly to the fabric. Such an interface allows for line cards to be created which are not constrained by the physical slot constraints for things like the form factor, faceplate capacity, power, and cooling. Since the power requirements are limited for such an application, it is expected that very high bandwidth slot densities are possible. For example, densities on the order of 6.4 Tbps/slot are possible. If the bandwidth requirements of the system ultimately need to grow beyond the single chassis, the same line module is used for interconnecting to the next layer of the fabric. The next layer of the fabric reuses the same chassis, but entirely includes optics only line modules. Ultimate fabric scale can be in the Peta bit scale with just the building blocks illustrated.

Figure 26:
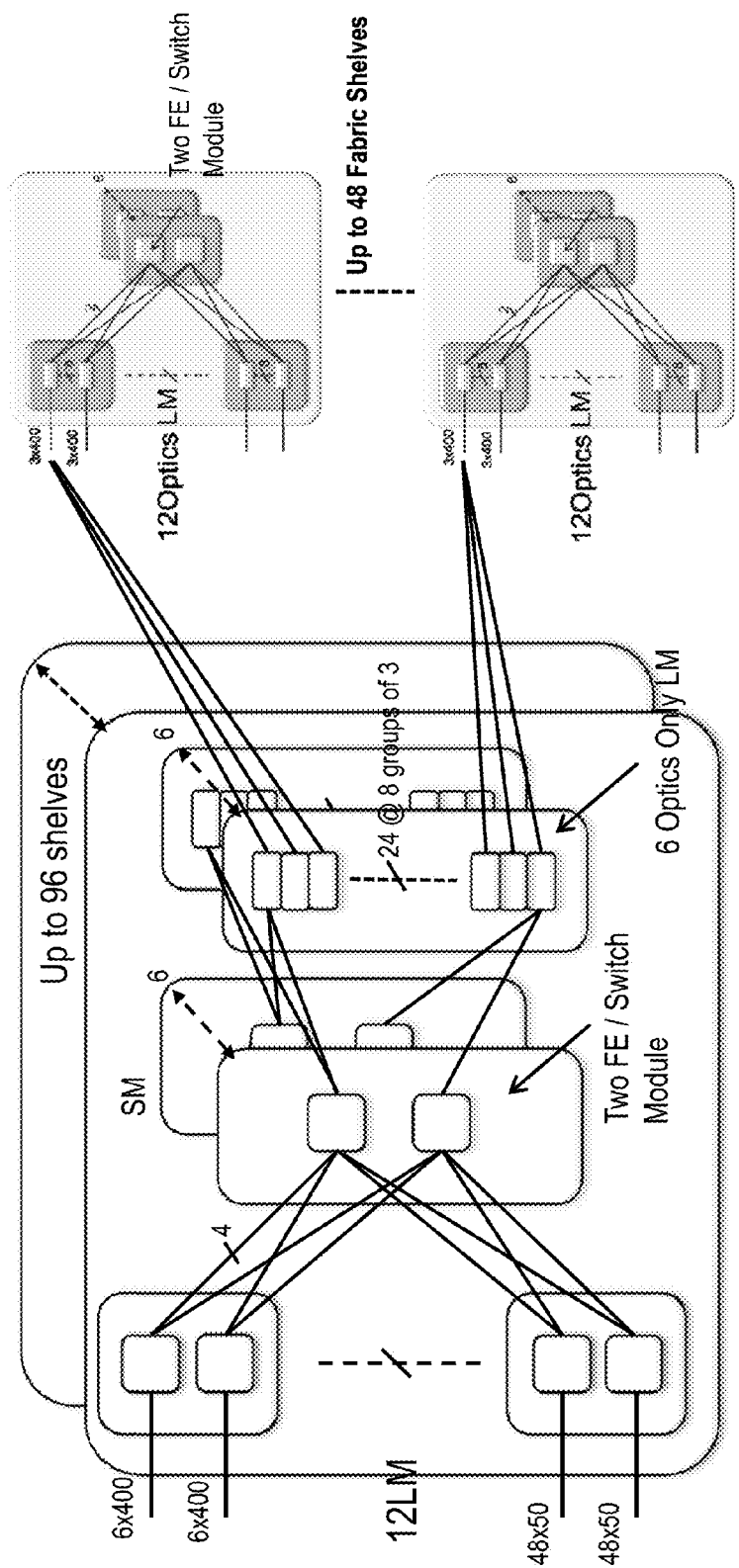
FIG. 26 is a block diagram of fabric expansion beyond a single shelf.

Referring to FIG. 26, in an exemplary embodiment, a block diagram illustrates fabric expansion beyond a single shelf. A spine Layer can include a line module shelf and fabric shelf. The line module shelf continues to use the same client cards (4.8 T) which adds an optics only line card of 2× density (24×400 G=9.6 T) for interconnecting to a fabric shelf and the fabric shelf uses only the optics line card and shares chassis and commons with the line module shelf. A 400 G Optical Engine supports 8×50 G SERDES. A group of 3 optical engines carries two SERDES from each of 12 FE in the shelf. There are 24 optical engines per optics LM supporting 8 groups of 3.

Figure 27:
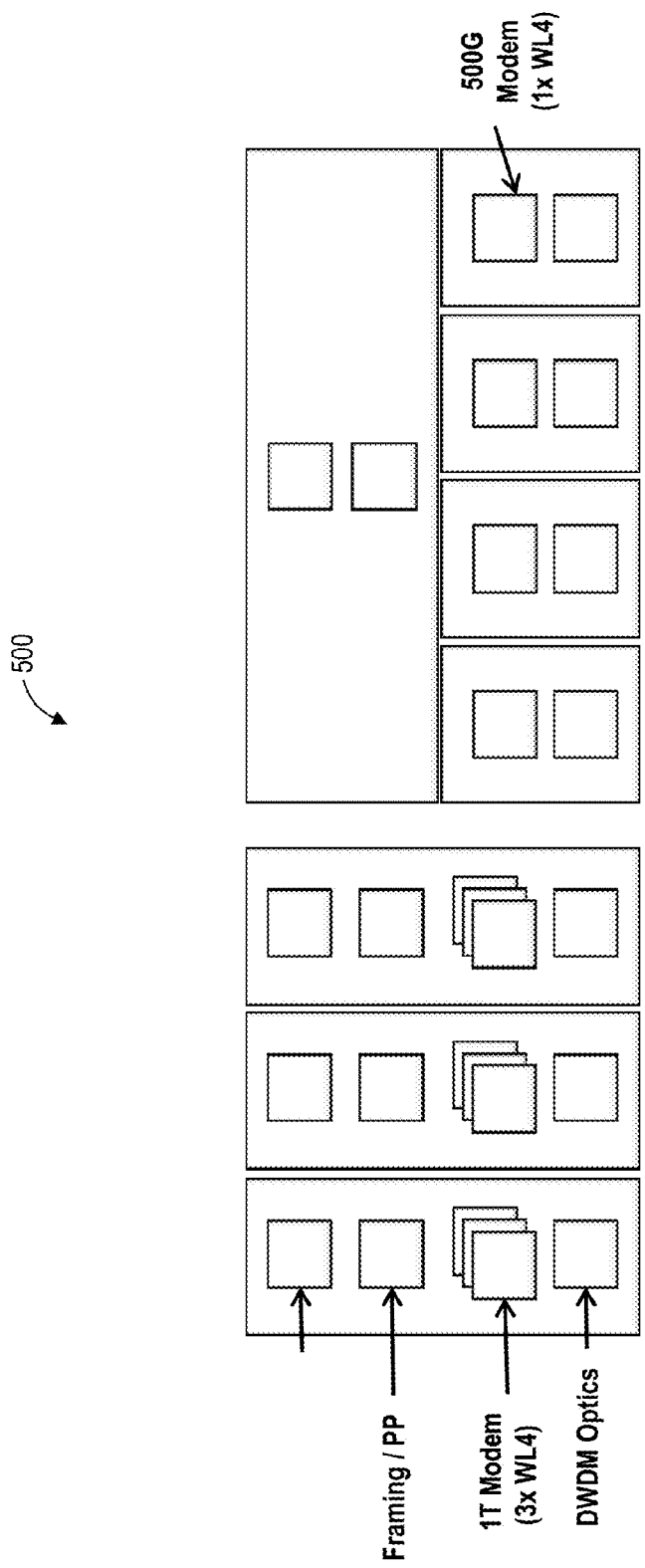
FIG. 27 is a block diagram of an external line module.

Referring to FIG. 27, in an exemplary embodiment, a block diagram illustrates an external line module 500. In some cases, the form factor within the chassis frame may limit the possible applications supported. An optics only line module can provide the ability to provide direct access to the fabric. The same optics line module can also be used to support multi-stage fabric growth options. External "pizza box" applications can then be integrated directly into the fabric at higher densities.

Physical Implementations

Figure 28:
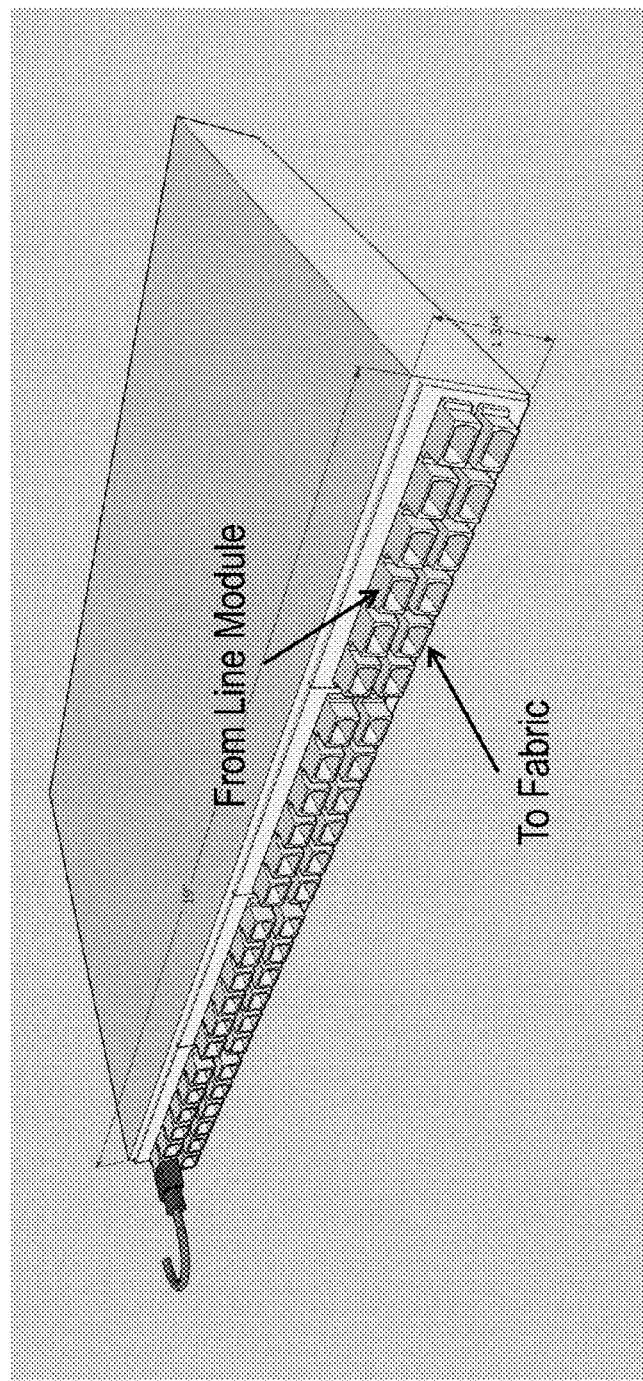
FIGS. 28-31 are perspective diagrams of a physical implementation of the first level of the shuffle in the optical interconnect.

Referring to FIG. 28, in an exemplary embodiment, perspective diagrams illustrate a physical implementation of the first level 52 of the shuffle in the optical interconnect 12. Here, the physical implementation is a 1 RU form factor supporting the line module 18 to fabric "shuffle" for up to twenty-four line modules 18. The shuffle function here can be incrementally upgraded in four groups of six line modules where each is shuffle provides the same function.

Figure 29:
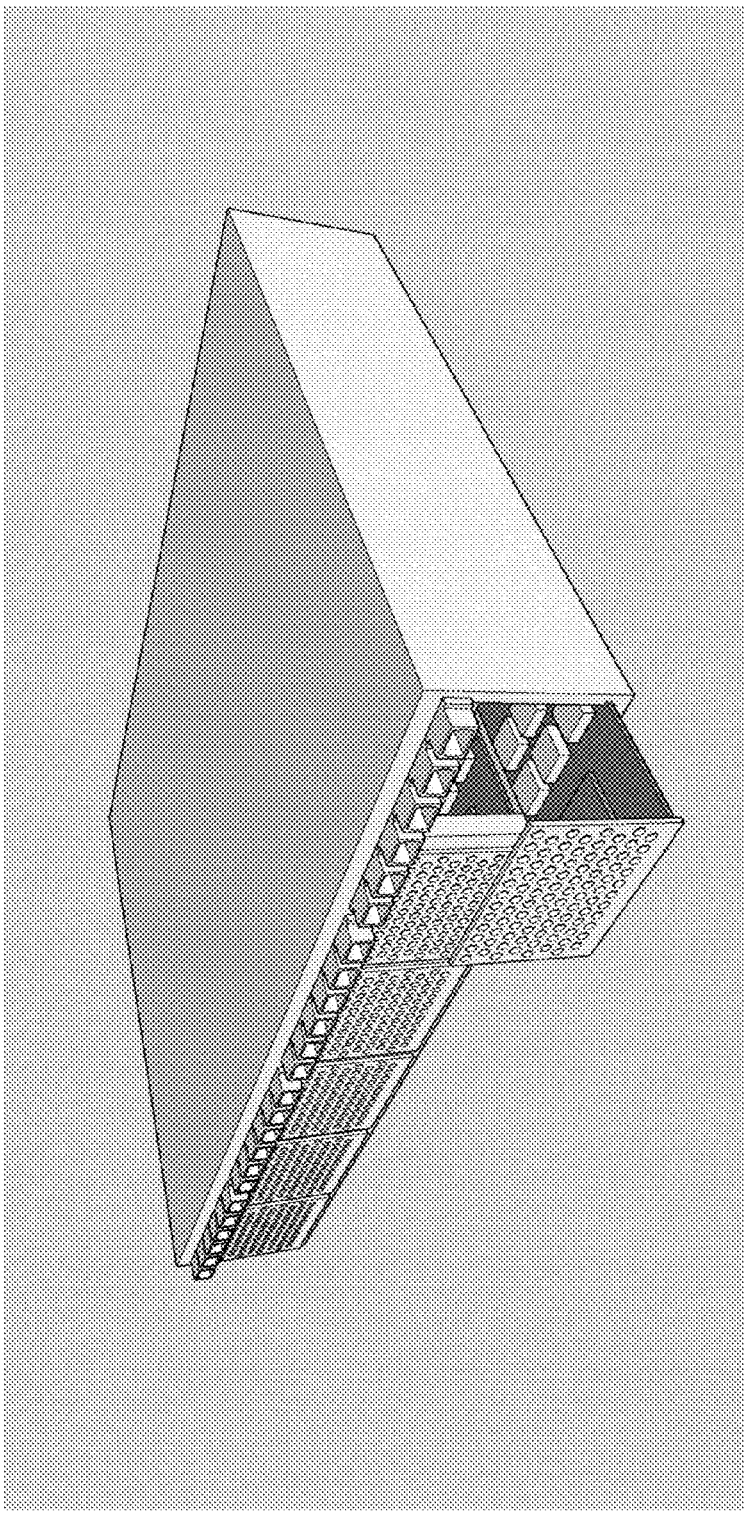
Figure 30:
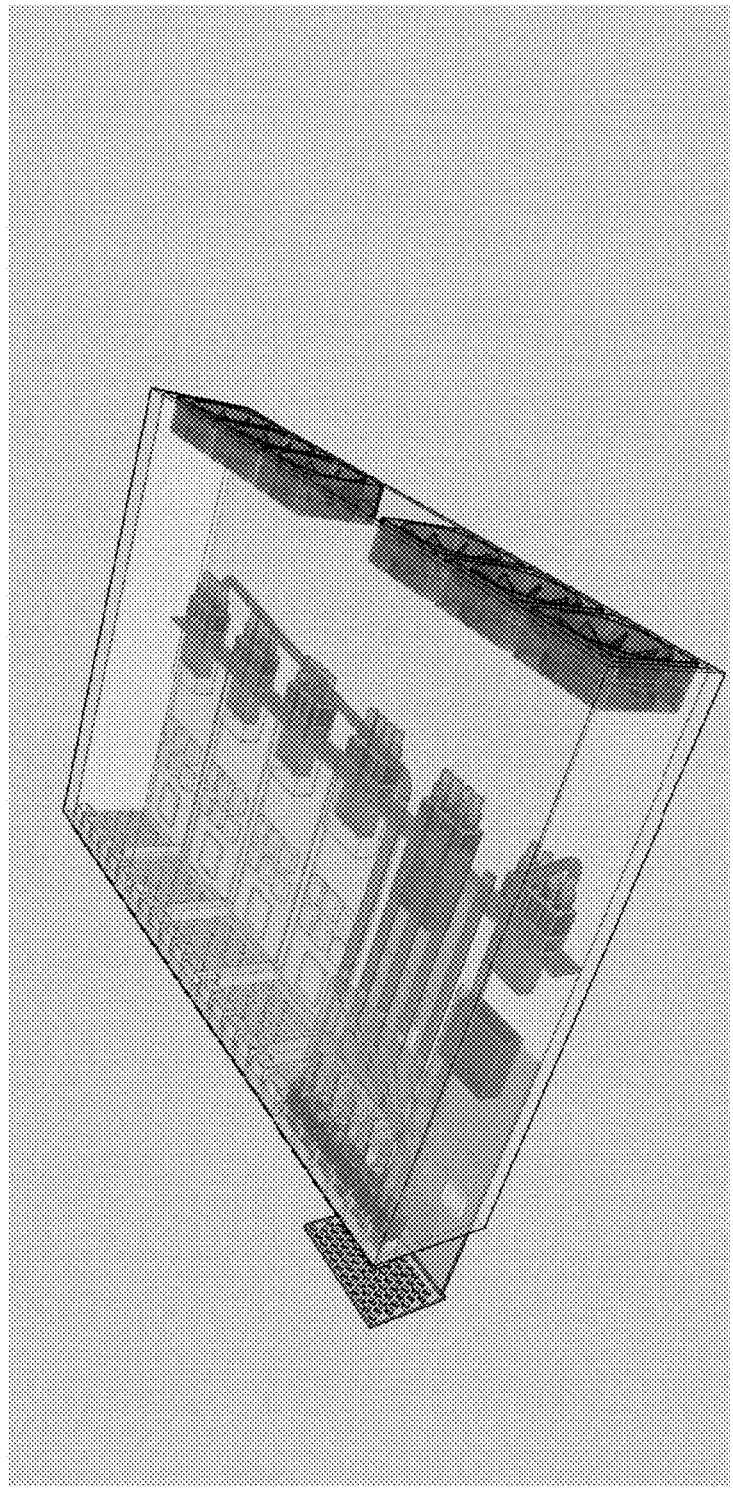
Figure 31:
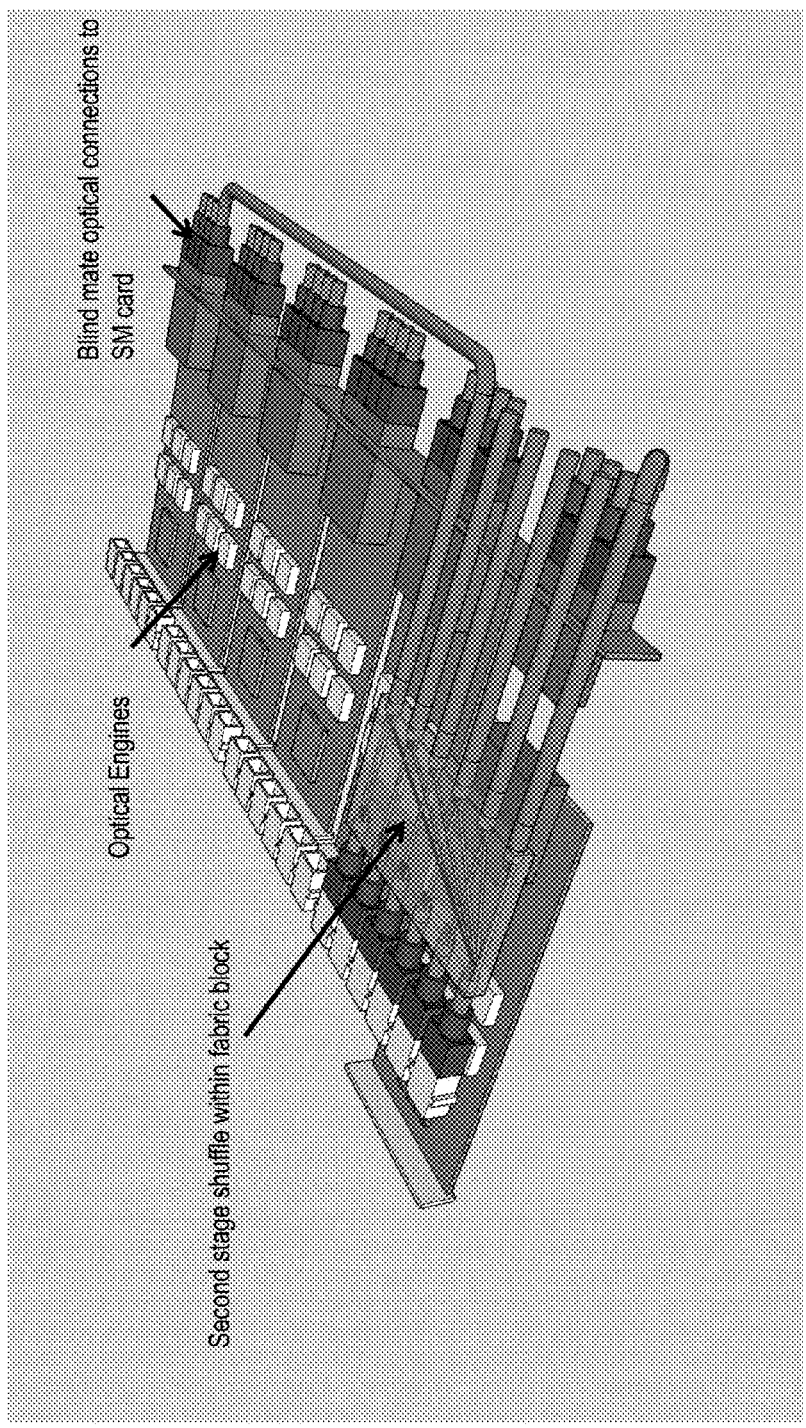
Figure 32:
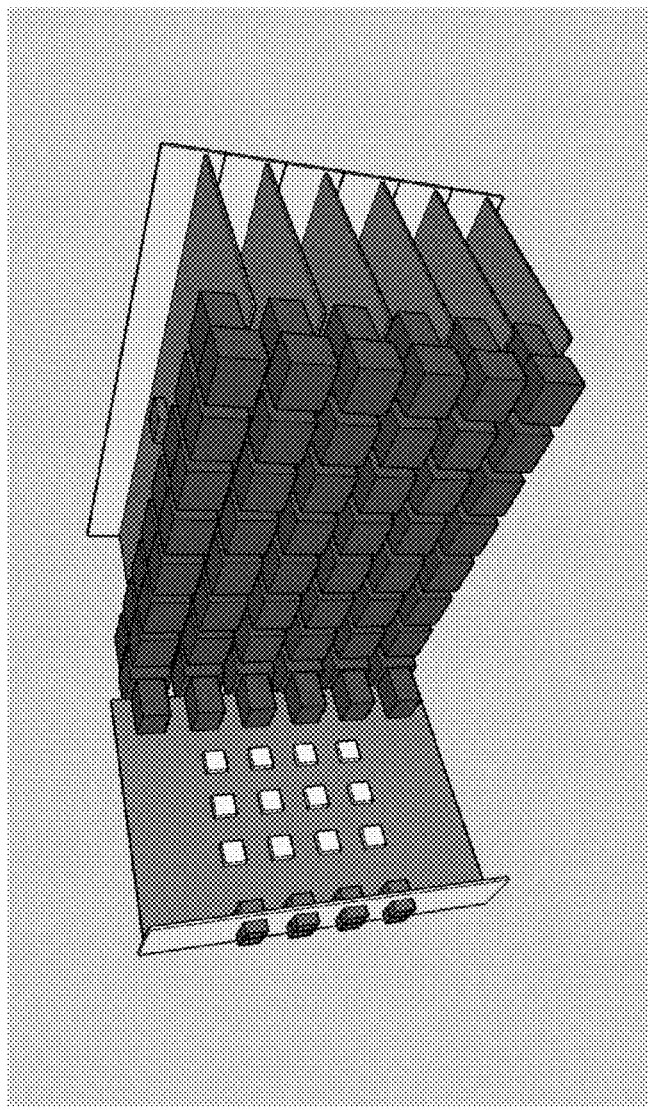
FIG. 32 is a perspective diagram of a physical implementation of the second level of the shuffle in the optical interconnect.

Referring to FIGS. 29-31, in an exemplary embodiment, a perspective diagram illustrates a physical implementation of the second level 52 of the shuffle in the optical interconnect 12 in the model of FIG. 17. Referring to FIG. 32, the second stage shuffle may also be realized by first performing an Optical-Electrical (OE) conversion and then performing the shuffle in the electrical domain in the example of FIG. 14. An example implementation could use orthogonal mating connectors where the OE conversion and distribution of signals to multiple fabric elements is done on the ingress/front cards. The rear cards host the fabric element chips themselves.

Figure 33:
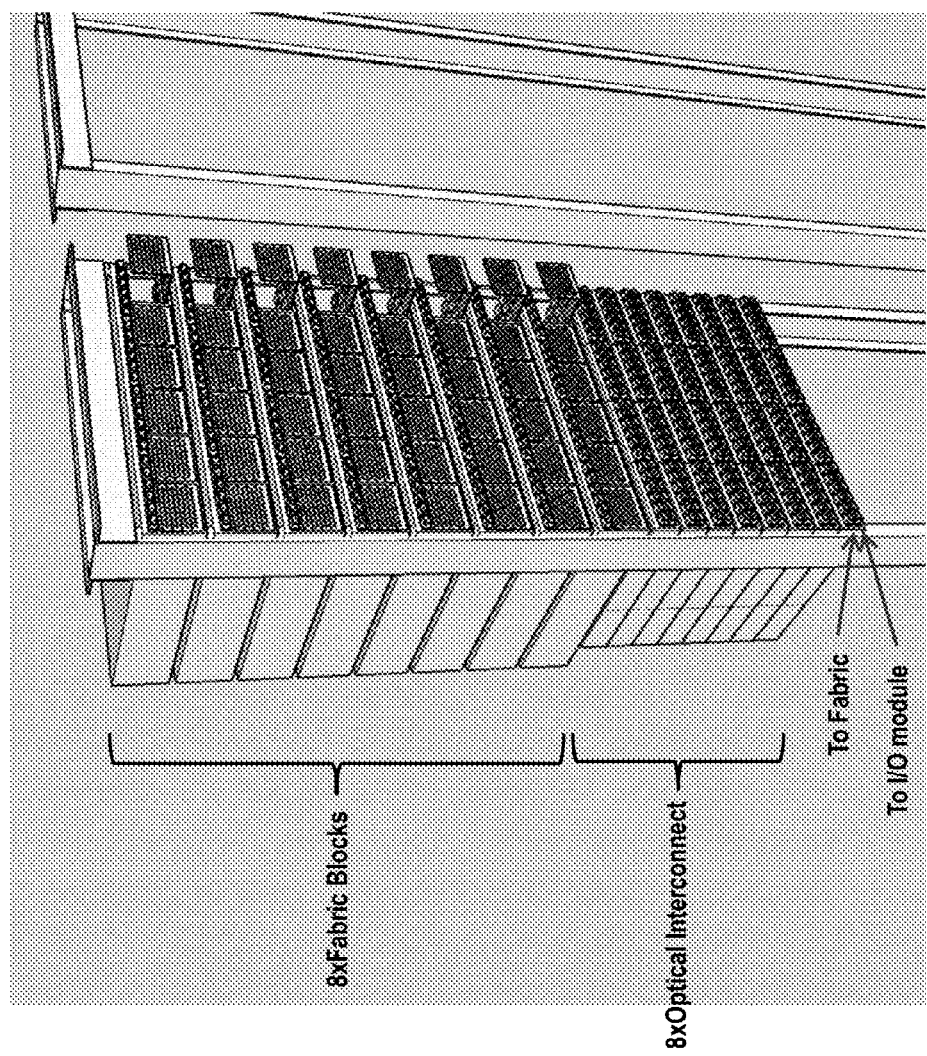
FIGS. 33-34 are perspective diagrams of a rack configuration.
Figure 34:
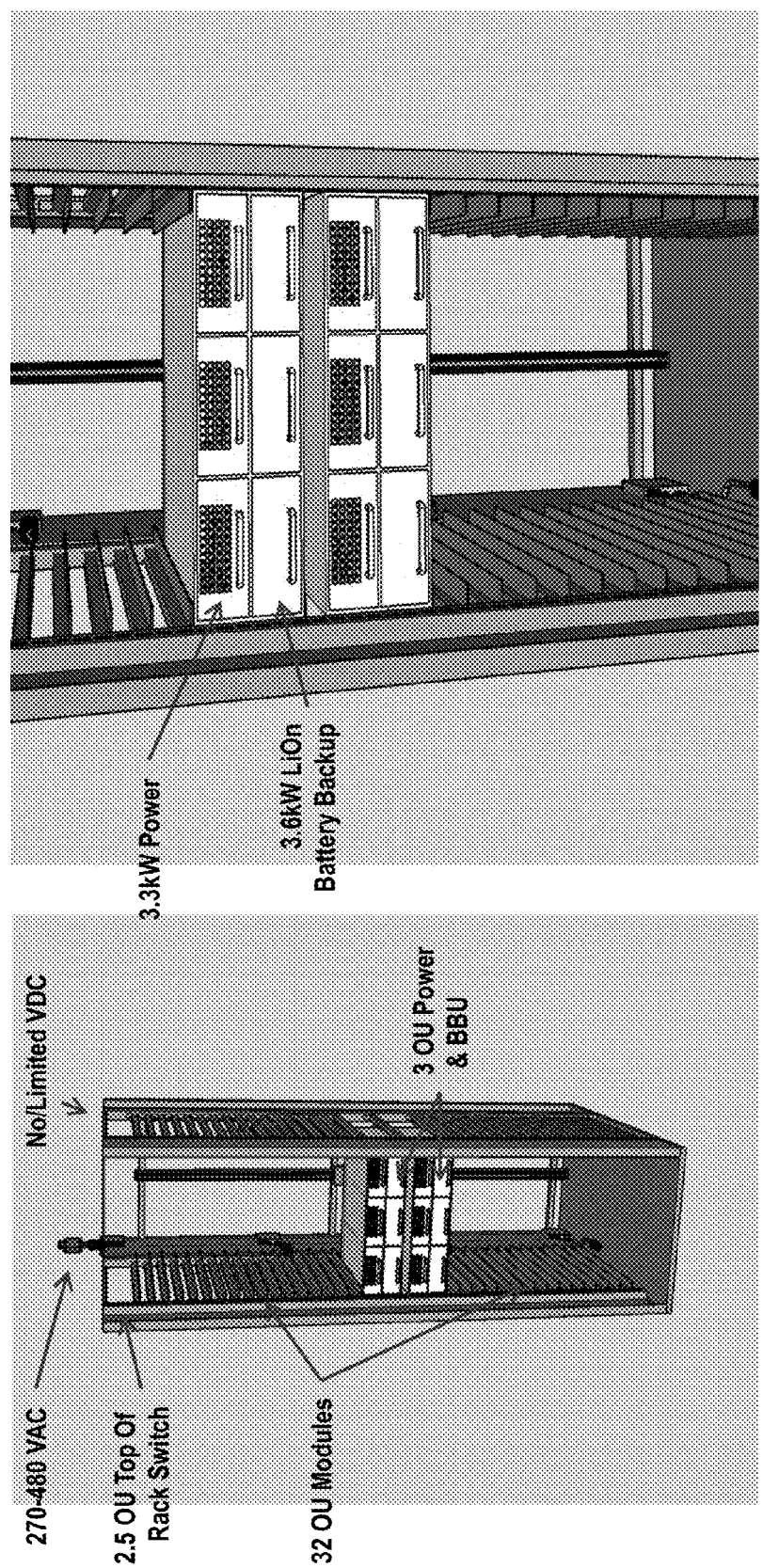
Figure 35:
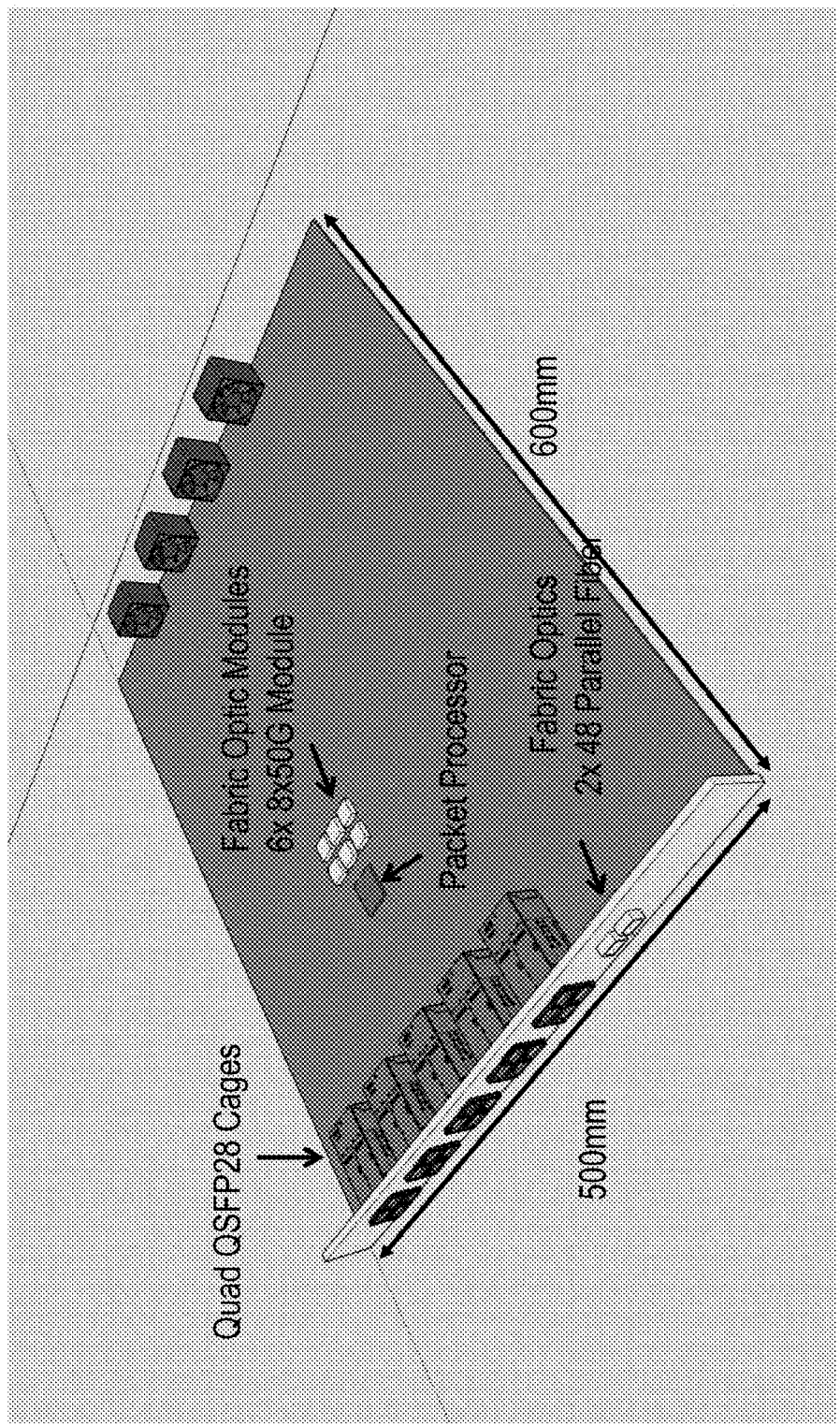
FIG. 35 is a block diagram of an exemplary line module.

Referring to FIGS. 33-34, in an exemplary embodiment, perspective diagrams illustrate a rack configuration. FIG. 33 is a 16 slot shelf for a 384 Tb/s fabric. FIG. 34 is an open rack configuration. Referring to FIG. 35, in an exemplary embodiment, a block diagram illustrates an exemplary line module.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A scalable switch fabric comprising:
a plurality of line modules each comprising fabric interface optics supporting a plurality of optical output signals;
an optical interconnect optically connected to each of the plurality of line modules via the fabric interface optics; and
a plurality of center stage switches, wherein the optical interconnect is adapted to shuffle the plurality of optical output signals from each of the plurality of line modules to the plurality of center stage switches, and wherein the optical interconnect comprises:
a first level of shuffle components connected to the one or more line modules, and
a second level of shuffle components integrated with the plurality of center stage switches, wherein the first level of shuffle components and the second level of shuffle components utilize one or more cyclic Arrayed Waveguide Grating (AWG) devices, wherein each of the plurality of center stage switches comprises a fabric block forming a part of the second level of shuffle, and wherein expansion of the scalable switch fabric is through addition of the first level of shuffle components and the second level of shuffle components and modification of cabling therebetween.

2. The scalable switch fabric of claim 1, wherein optical connections in the fabric block remain fixed as the scalable switch fabric grows and optical connections between the first level of shuffle components and the second level of shuffle components are modified as the scalable switch fabric grows.

3. The scalable switch fabric of claim 1, wherein optical connections between the optical interconnect and the plurality of center stage switches remain partially fixed as the scalable switch fabric grows through addition of more first level of shuffle components and more second level of shuffle components.

4. The scalable switch fabric of claim 1, wherein the optical interconnect connects to the plurality of line modules via bundled fiber cables each comprising a plurality of optical fibers and a single connector for all of the plurality of optical fibers.

5. The scalable switch fabric of claim 1, wherein the optical interconnect connects to the plurality of line modules via Dense Wave Division Multiplexing (DWDM) for the plurality of optical output signals from each of the fabric interface optics.

6. The scalable switch fabric of claim 1, wherein the scalable switch fabric is connected with an existing switch comprising an electrical backplane for expansion thereof.

7. A scalable switch fabric method comprising:
providing a plurality of line modules each comprising fabric interface optics supporting a plurality of optical output signals;
providing an optical interconnect optically connected to each of the plurality of line modules via the fabric interface optics; and
providing a plurality of center stage switches, wherein the optical interconnect is adapted to shuffle the plurality of optical output signals from each of the plurality of line modules to the plurality of center stage switches, and wherein the optical interconnect comprises:
a first level of shuffle components connected to the one or more line modules, and
a second level of shuffle components integrated with the plurality of center stage switches, wherein the first level of shuffle components and the second level of shuffle components utilize one or more cyclic Arrayed Waveguide Grating (AWG) devices,
wherein each of the plurality of center stage switches comprises a fabric block forming a part of the second level of shuffle, and wherein expansion of the scalable switch fabric is through addition of the first level of shuffle components and the second level of shuffle components and modification of cabling therebetween.

8. The scalable switch fabric method of claim 7, wherein optical connections in the fabric block remain fixed as the scalable switch fabric grows and connectivity between the first level of shuffle components and the second level of shuffle components is modified as the scalable switch fabric grows.

9. The scalable switch fabric method of claim 7, wherein the optical interconnect connects to the plurality of line modules via bundled fiber cables each comprising a plurality of optical fibers and a single connector for all of the plurality of optical fibers.

10. The scalable switch fabric method of claim 7, wherein the optical interconnect connects to the plurality of line modules via Dense Wave Division Multiplexing (DWDM) for the plurality of optical output signals from each of the fabric interface optics.

11. The scalable switch fabric method of claim 7, wherein the scalable switch fabric is connected with an existing switch comprising an electrical backplane for expansion thereof.

12. A switch system with optical interconnections, the switch system comprising:
a plurality of line modules each comprising fabric interface optics supporting a plurality of optical output signals;
a first level of optical shuffle components connected to each of the fabric interface optics; and
a plurality of fabric blocks collectively forming a second level of optical shuffle components connected to the first level of optical shuffle components and a plurality of center stage switches each optically connected to the second level of optical shuffle components in a fixed manner;
wherein expansion of the switch system comprises modification of connections between the first level of optical shuffle components and the second level of optical shuffle components with the connections in the one or more fabric blocks in the fixed manner,
wherein the first level of optical shuffle components and the second level of optical shuffle components utilize one or more cyclic Arrayed Waveguide Grating (AWG) devices.

13. The switch system of claim 12, wherein the plurality of line modules are connected to the first level of optical shuffle via bundled fiber cables each comprising a plurality of optical fibers and a single connector for all of the plurality of optical fibers.

14. The switch system of claim 12, wherein the plurality of line modules are connected to the first level of optical shuffle via Dense Wave Division Multiplexing (DWDM) for the plurality of optical output signals from each of the fabric interface optics.

* * * * *